(12) United States Patent
Ibuki et al.

(10) Patent No.: US 7,343,371 B2
(45) Date of Patent: Mar. 11, 2008

(54) QUERIES-AND-RESPONSES PROCESSING METHOD, QUERIES-AND-RESPONSES PROCESSING PROGRAM, QUERIES-AND-RESPONSES PROCESSING PROGRAM RECORDING MEDIUM, AND QUERIES-AND-RESPONSES PROCESSING APPARATUS

(75) Inventors: Jun Ibuki, Kawasaki (JP); Fumihito Nishino, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 190 days.

(21) Appl. No.: 10/028,423

(22) Filed: Dec. 28, 2001

(65) Prior Publication Data

US 2003/0041058 A1 Feb. 27, 2003

(30) Foreign Application Priority Data

Mar. 23, 2001 (JP) .............................. 2001-084839

(51) Int. Cl.
 G06F 7/00 (2006.01)
 G06F 17/30 (2006.01)
 G06F 17/27 (2006.01)
(52) U.S. Cl. ..................... 707/4; 707/2; 707/3; 707/5; 704/9
(58) Field of Classification Search ................... 707/3, 707/4
 See application file for complete search history.

(56) References Cited

U.S. PATENT DOCUMENTS

| | | | | |
|---|---|---|---|---|
| 5,640,553 A * | 6/1997 | Schultz | ........................... | 707/5 |
| 5,752,244 A * | 5/1998 | Rose et al. | ..................... | 707/5 |
| 5,907,837 A * | 5/1999 | Ferrel et al. | ................... | 707/3 |
| 6,243,670 B1 * | 6/2001 | Bessho et al. | ................. | 704/9 |
| 6,401,084 B1 * | 6/2002 | Ortega et al. | .................. | 707/2 |
| 6,574,622 B1 * | 6/2003 | Miyauchi et al. | .............. | 707/4 |
| 7,058,564 B2 * | 6/2006 | Ejerhed | .......................... | 704/1 |
| 2001/0044758 A1 * | 11/2001 | Talib et al. | .................... | 705/27 |
| 2001/0047355 A1 * | 11/2001 | Anwar | .......................... | 707/5 |
| 2002/0042784 A1 * | 4/2002 | Kerven et al. | ................ | 706/12 |
| 2002/0107735 A1 * | 8/2002 | Henkin et al. | ................ | 705/14 |

(Continued)

FOREIGN PATENT DOCUMENTS

JP S62-49436 3/1987

OTHER PUBLICATIONS

U.S. Appl. No. 60/189,925.*

(Continued)

*Primary Examiner*—Wilson Lee
*Assistant Examiner*—Cheryl M Shechtman
(74) *Attorney, Agent, or Firm*—Staas & Halsey LLP

(57) ABSTRACT

A query-and-response processing method for analyzing the intention of a query provided by a user reduces search result information to an amount manageable for the user, sorts out the result information, and presents it in an easily readable form to the user. A search request analyzer analyzes a search request provided from the user, a search criteria generator generates search criteria, then a search executor searches through a database. A query intention analyzer analyzes the intention of a query from the user, such as a query topic, and an output formatter, based on the result of the analysis, selects items to be presented to the user from the search results and determines the output format of the search results. A presentation module receives the results and presents the data to the user.

45 Claims, 22 Drawing Sheets

U.S. PATENT DOCUMENTS

2004/0049499 A1*   3/2004   Nomoto et al. ................. 707/3
2005/0228639 A1*   10/2005  Abe et al. ...................... 704/7
2007/0130112 A1*   6/2007   Lin ............................... 707/2

OTHER PUBLICATIONS

U.S. Appl. No. 60/238,566.*
U.S. Appl. No. 60/193,263.*
U.S. Appl. No. 60/229,452.*

Outline of the Automated Knowledge Acquisition System based on an infant mode, Jun Ginbayashi, Norio Fujii, the 35th IPSJ Journal, Information Processing Society of Japan, Japan (Mar. 18, 1987).

"Tool for Construction of Consultation Models", Norio Fujii, Jun Ginbayashi, Noritoshi Murakami, Fujitsu, vol. 39, No. 3, pp. 223-228, (Jun. 1988).

Notification of Reasons for Rejection to the Japanese Patent Application No. 2001-084839 relevant to the U.S. Appl. No. 10/028,423.

* cited by examiner

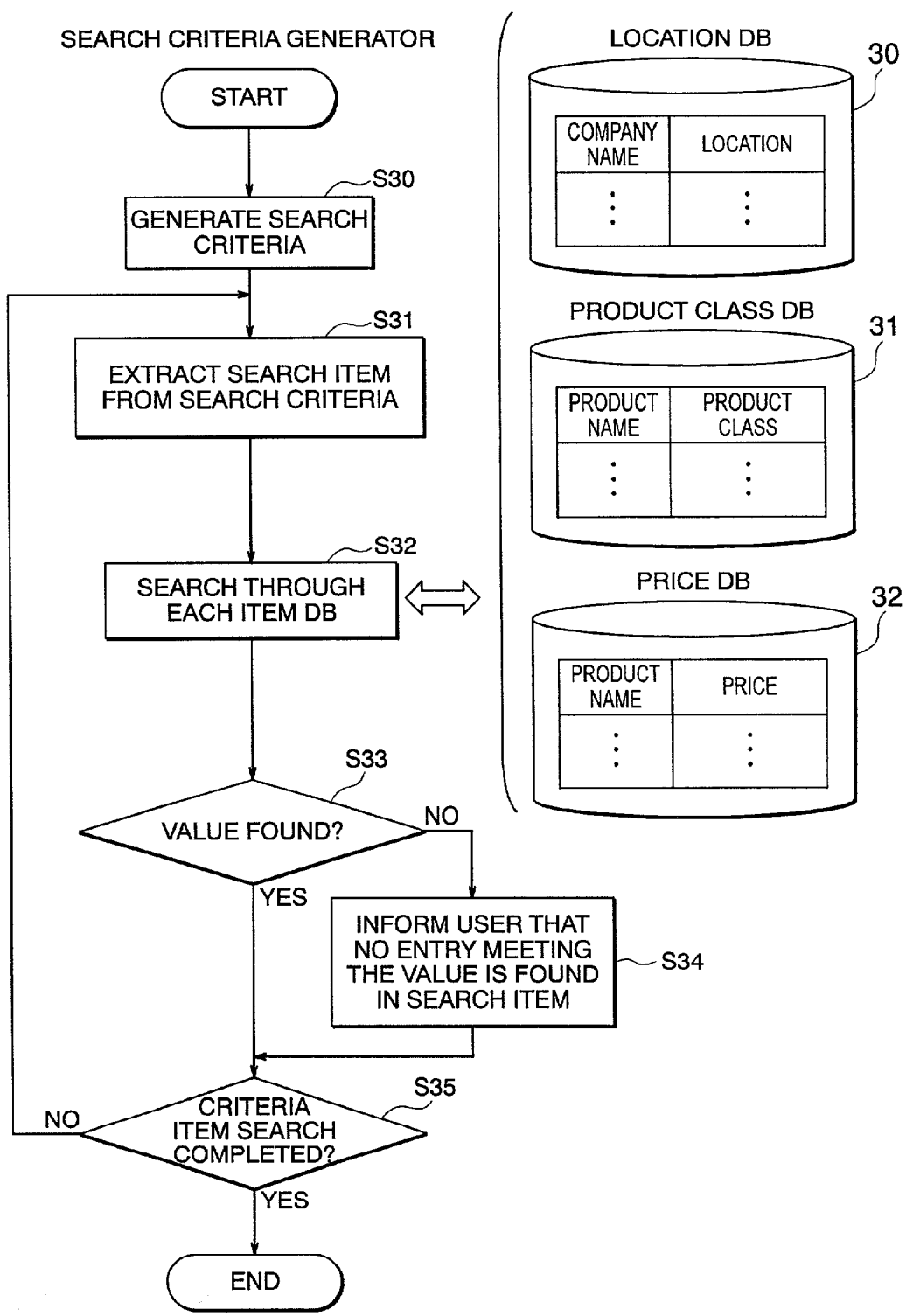

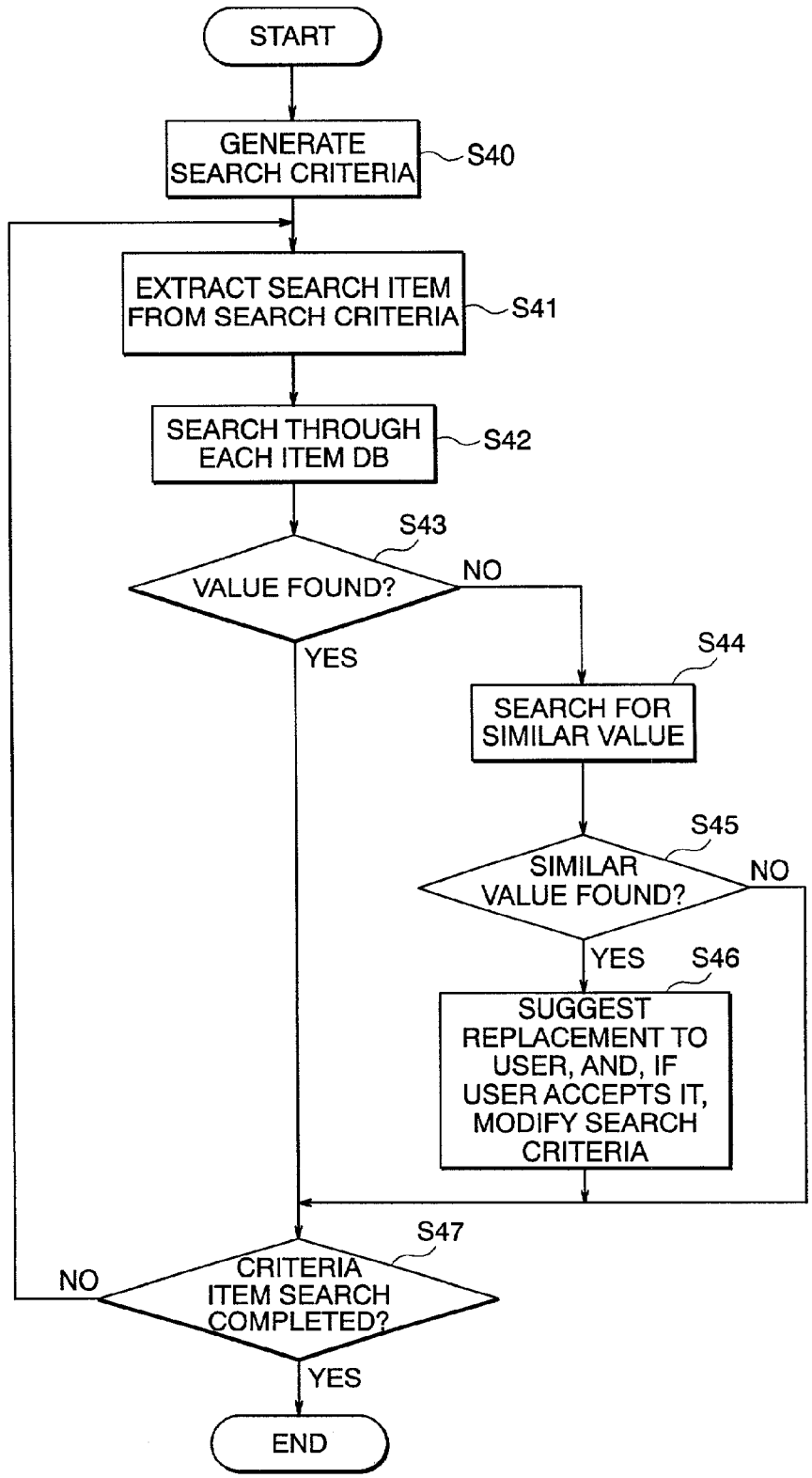

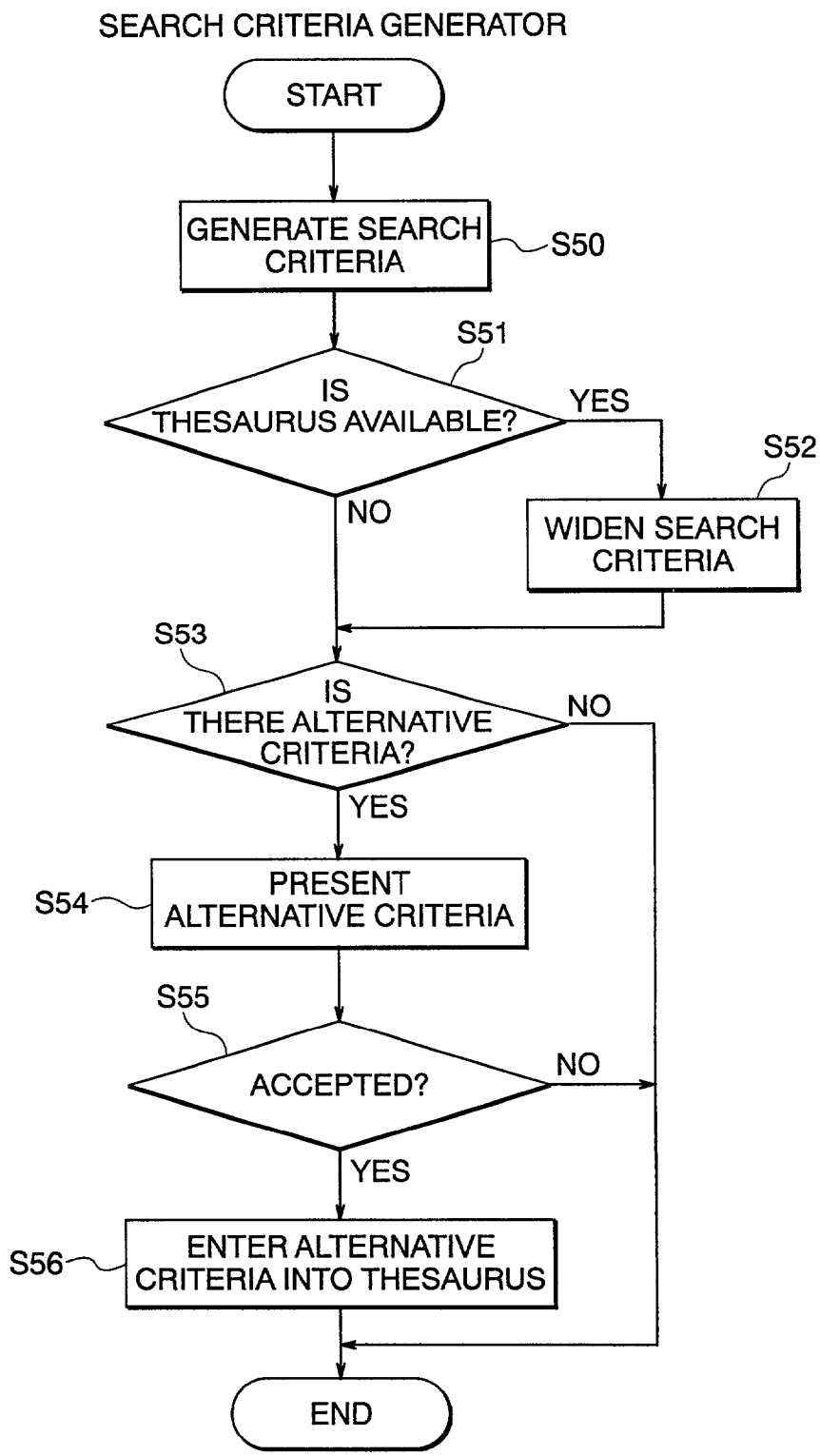

WIDENING SEARCH CRITERIA

FIG. 19

PROCESS FOR COMPLEMENTING TEXT IN DATABASE (A) CORRESPONDENCE TABLE BETWEEN TAGS AND SECONDARY DBS

50

| TAG ITEM | A | B | REPRESEN-TATIVE | LOCATION |
|---|---|---|---|---|
| SECONDARY DB | NONE | DB1 | DB2 | DB3 |

(B)

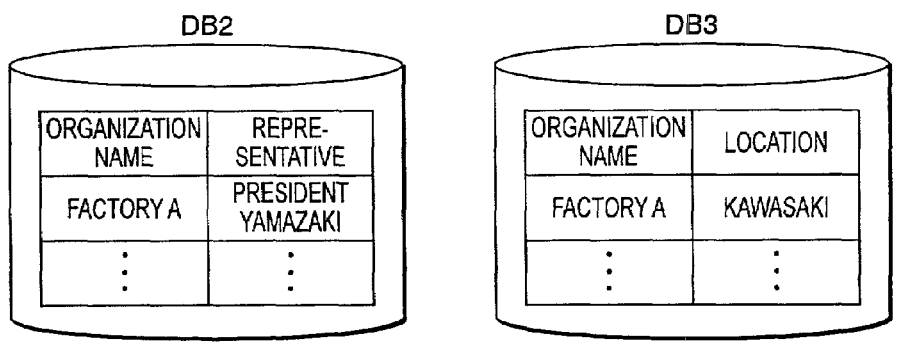

(C) ESSENTIAL ITEM LIST

51

| ORGANIZATION | ORGANIZATION NAME | LOCATION | REPRESENTATIVE |
|---|---|---|---|
| PRODUCT | PRODUCT CLASS | PRODUCT NAME | PRICE |
| ⋮ | ⋮ | ⋮ | ⋮ |

(D) TEXT

52

⟨ORGANIZATION NAME⟩ FACTORY A ⟨/ORGANIZATION NAME⟩

(E) COMPLEMENT TEXT

53

⟨ORGANIZATION NAME⟩ FACTORY A ⟨/ORGANIZATION NAME⟩
⟨REPRESENTATIVE⟩ PRESIDENT YAMAZAKI
⟨/REPRESENTATIVE⟩⟨LOCATION⟩ KAWASAKI ⟨/LOCATION⟩

QUERIES-AND-RESPONSES PROCESSING METHOD, QUERIES-AND-RESPONSES PROCESSING PROGRAM, QUERIES-AND-RESPONSES PROCESSING PROGRAM RECORDING MEDIUM, AND QUERIES-AND-RESPONSES PROCESSING APPARATUS

BACKGROUND OF THE INVENTION

1. Field of the Invention

The present invention relates to a query-and-response processing method for querying a database in a natural language as to information about a person or thing such as an organization contained in the database and presenting the information which a user requires.

2. Description of the Prior Art

Many systems that receive queries about data in a database and present a corresponding entry or data provided by processing the entry have been prototyped in laboratories and described in many papers However, the systems conventionally studied accept queries like "How high is the Eiffel Tower?" or "What nationality is the winner of the giant slalom in the Lillehammer Winter Olympic Games?" that are unambiguous and would yield a small number of answers.

On the other hand, text-based searches will increase that are ambiguous and sometimes yield a huge number of results that are difficult to determine their appropriateness. For example, if technologies relating to a particular technology are searched for among a huge number of patent documents, it is impossible to provide a clear single answer to the query. Therefore technologies used in the conventional query-response systems cannot be used readily in cases where a query may yield various answers.

As in the example in which patent documents relating to a technology are searched for, a text-based search in practice is not a simple query-and-response session, data to be retrieved is ambiguous, and yield a huge number of results that are difficult to determine their appropriateness. Therefore if unprocessed search results are presented to a user in a conventional system, the user has to perform a number of tasks such as the selection and extraction of required information.

SUMMARY OF THE INVENTION

In view of these problems, it is an object of the present invention to analyze the intention of a query provided by a user to reduce search result information to an amount manageable for the user, sort out the result information, and present it in an easily readable form to the user by selecting information.

To achieve the object, the present invention provides a query-and-response processing method for receiving a search request involving a query input by a user and searching a database to present search results to the user, comprising the steps of analyzing the search request provided by the user, generating search criteria based on the result of the search request analysis, and searching the database according to the search criteria. The main characteristics of the present invention also include the steps of analyzing the intention of the query based on the result of the search request analysis, selecting items to be presented to the user from the search results, determining an output form according to the result of the analysis of the intention of the query, and adjusting the number and output form of the search results according to the needs of the user to present the search results to the user.

The intention of the query provided by the user may be determined by finding a key topic of the search request and selecting main items concerning the key topic and items relating to the main items as items to be presented to process the search results.

The process described above may be implemented by a computer and a software program. The program may be stored on an appropriate recording medium such as a portable-medium memory, semiconductor memory, and hard disk that are readable by the computer.

BRIEF DESCRIPTION OF THE DRAWINGS

The present invention will be described below in detail with reference to the accompanying drawings. However, the present invention is not limited to embodiments described below.

FIG. 10 is a diagram for illustrating an example of an embodiment of the search criteria generator;

FIG. 11 shows an example of another embodiment of the search criteria generator;

FIG. 12 shows an example of another embodiment of the search criteria generator;

FIG. 19 shows an example of a text complement process when text is entered into the database;

DETAILED DESCRIPTION OF PREFERRED EMBODIMENTS

Figure 1:
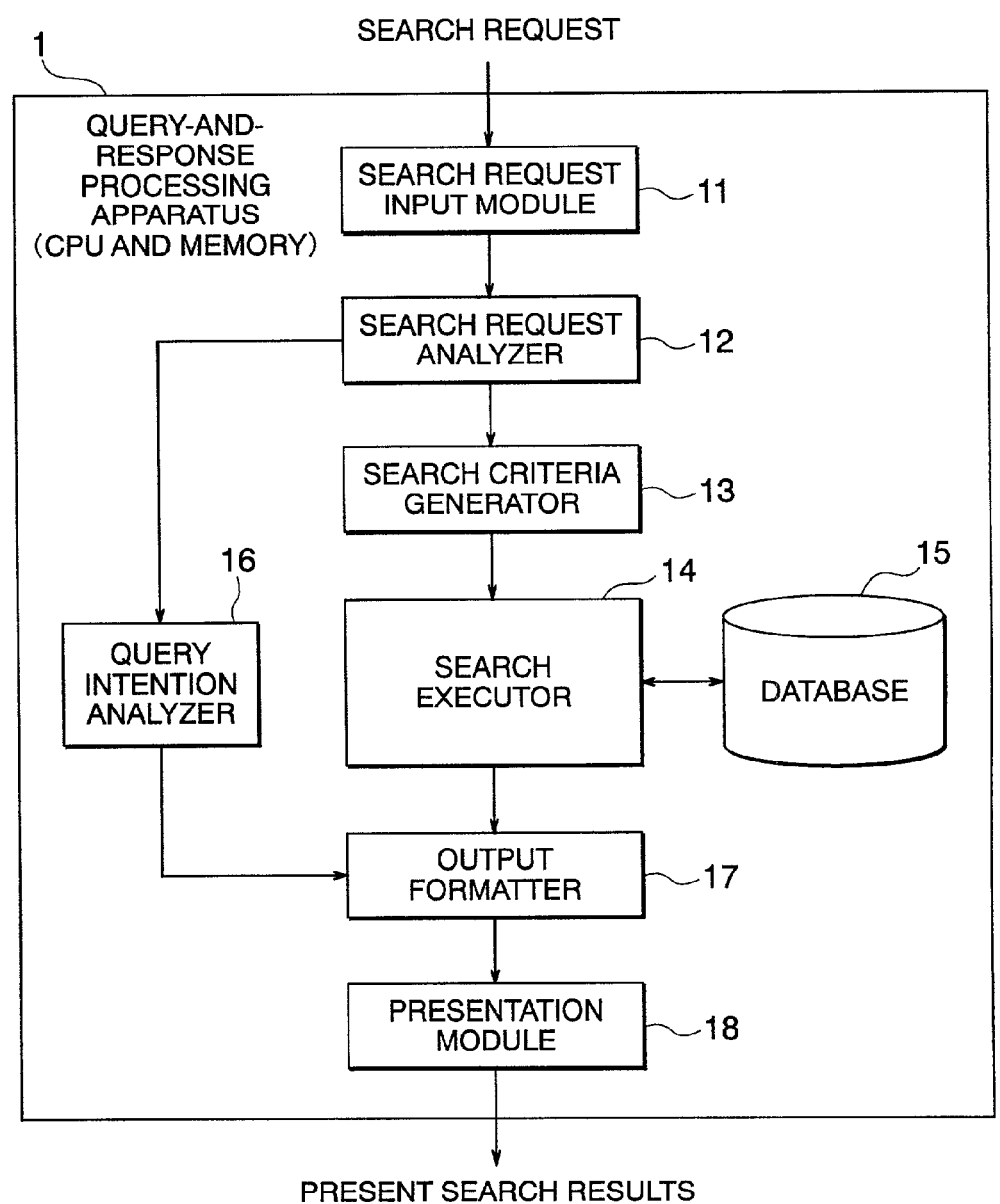
FIG. 1 shows an exemplary configuration of a query-and-response processing apparatus in which the present invention is implemented.

FIG. 1 shows an exemplary configuration of a query-and-response processing apparatus in which the present invention is implemented. The query-and-response processing apparatus 1 comprises a CPU, memory, and a software program for implementing the following means.

A search request by a user is input through a search request input module 11. In an embodiment, the search request is input by the user in the form of a query in a natural language. The search request may be any types of input such as a keyboard input, voice input through a microphone, an input from an information terminal connected to the apparatus through a communications line, or an input from an application program.

A search request analyzer 12, which is a search requesting module, analyzes the structure of the search request input through the search request input module 11 to extract things acting as the topic of the query and constrains on the topic. A search criteria generator 13, which is a search criteria generating module, receives an output from the search request analyzer 12 and translates it into search criteria for finding entries in a database 15. A search executor 14, which is a search executing module, searches through the database 15 based on the provided search criteria and returns search results.

A query intention analyzer 16, which is a query intention analyzing module, determines the intention of the query from the user based on the result of the search request analysis and determines a presenting way in which the information is presented to the user. An output formatter 17, which is an output formatting module, receives the output from the query intention analyzer 16, extracts information from the search results, determines items to be presented, adjusts their presentation format, and presents the search result in a form easily readable to the user.

Figure 2:
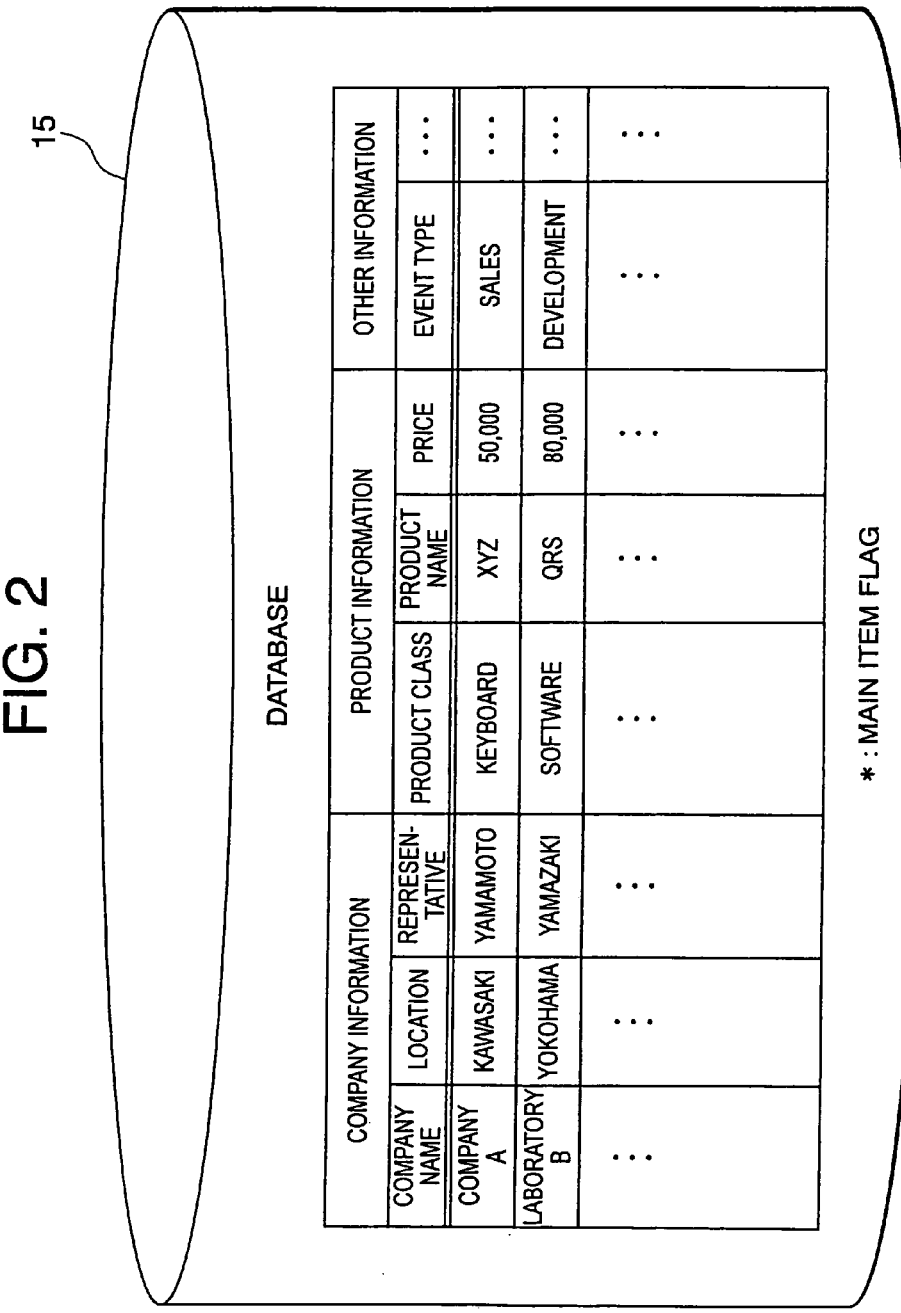
FIG. 2 shows an example of a database to be searched.

The embodiment will be described below mainly with respect to an example in which a tabular database 15 as shown in FIG. 2 is searched through, for simplicity. Important items in the database 15 are marked with a flag ("*" in FIG. 2) indicating that they are key items. The database 15 searched is not necessarily limited to the tabular database as shown in FIG. 2. It may be one that consists of tagged structured text data.

For example, the tabular database 15 shown in FIG. 2 may be readily changed into the following tagged structured text data:

<organization information> <company information> <company name> company A </company name> <location> Kawasaki </location> <representative> Yamamoto </representative> <product information> <product class> keyboard </product class> . . . </company information> </organization information>

For convenience, upper level items such as "company information" and "product information" shown in FIG. 2 or semantic information corresponding to them are sometimes called category hereinafter.

Figure 3:
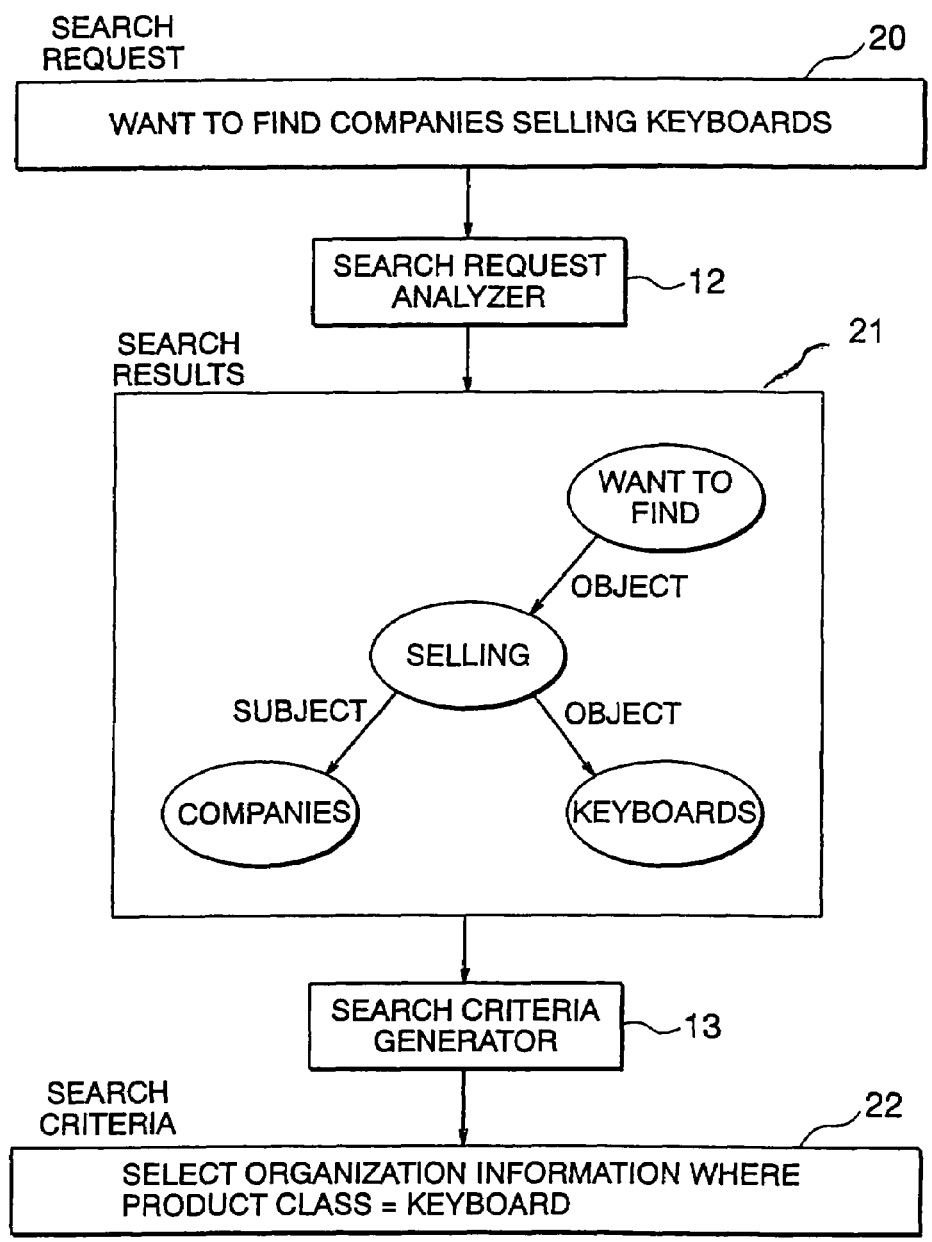
FIG. 3 shows an example of a search request analysis.

FIG. 3 shows an example of a search request analysis. When a search request 20 provided by a user in a natural language is input to the search request analyzer 12, the search request analyzer 12 analyzes its sentence structure through a known natural language analysis (such as a morpheme analysis). Information about components of the input sentence and the relationship among them are yielded as the search results 21. The search criteria generator 13 uses the search results 21 to generate a search command in which criteria like search criteria 22 are specified. In this example, the information to be searched is "organization information" and a search for an entry having the product class, "keyboard", is requested. The search command with the search criteria 22 is provided to the search executor 14 and the search executor 14 searches through the database 15.

Figure 4:
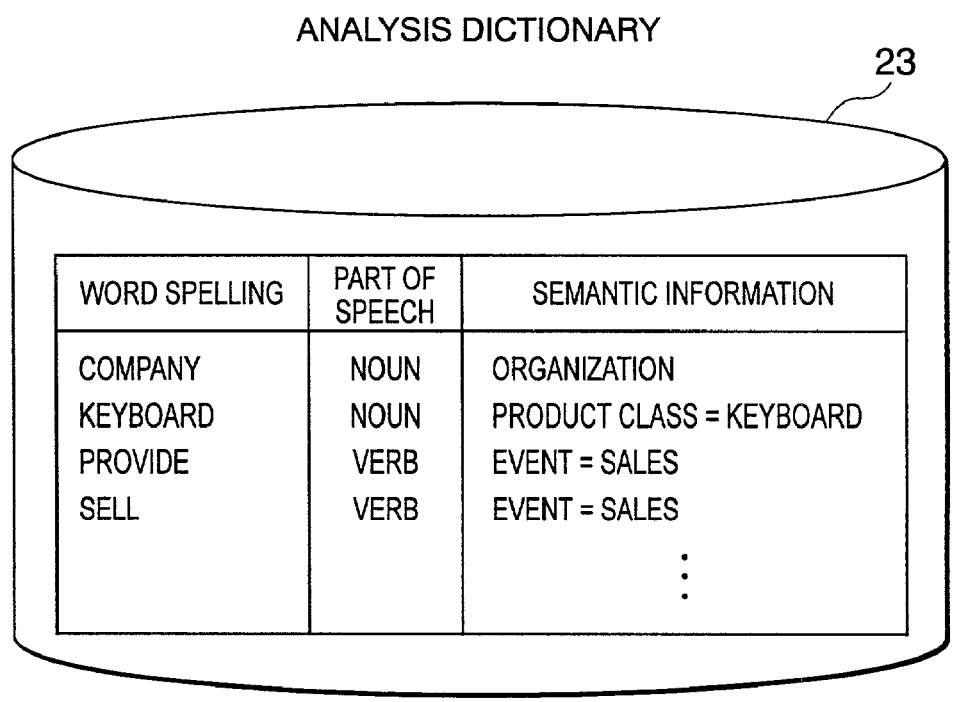
FIG. 4 shows an example of an analysis dictionary used by a search request analyzer.

FIG. 4 shows an example of an analysis dictionary 23 used by the search request analyzer 12. The analysis dictionary 23 for a natural language contains parts of speech, semantic information, and other information associated with respective word spellings. Natural language analysis technologies using such an analysis dictionary 23 are well known and therefore the detailed description of which will be omitted herein.

Figure 5:
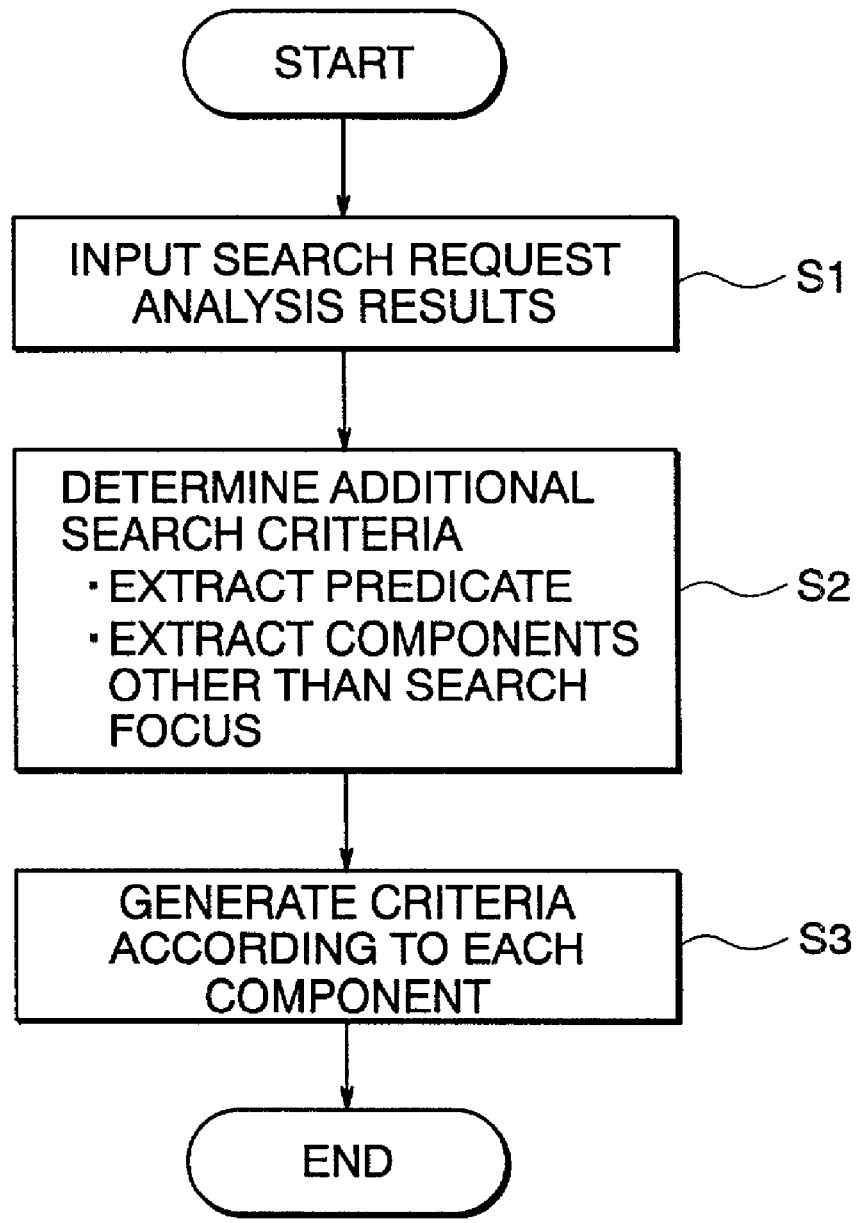
FIG. 5 shows a process flow in a search criteria generator.

FIG. 5 shows a process flow in the search criteria generator 13. The search criteria generator 13 inputs the result analyzed by the search request analyzer (step S1), and determines additional search criteria (step S2). A predicate (verb) may be extracted as search criteria to make an additional search criteria, or components other than a search focus may be extracted to add the search criteria. Then criteria are generated according to each component extracted (step S3)

Figure 6:
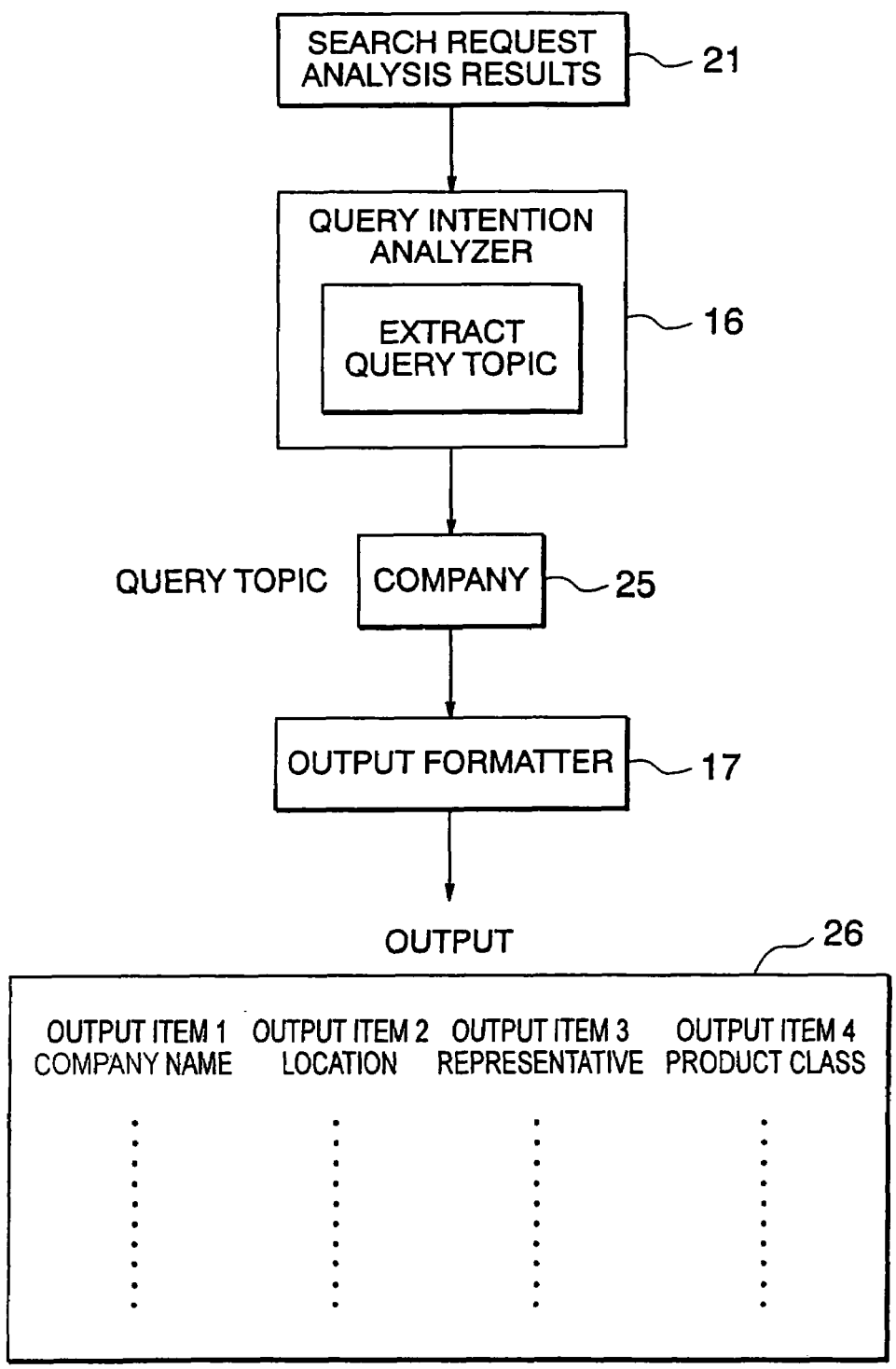
FIG. 6 is a diagram for illustrating a process performed by a query intention analyzer and an output formatter.

FIG. 6 illustrates a process performed by the query intention analyzer 16 and the output formatter 17. The query intention analyzer 16 analyzes a query to determine the topic of the query. In this example, that a query is "company" of topic 25 is output as a result of the analysis.

Then, the output formatter 17 receives the search results from the search executor 14 and the output (the query topic 25 in this example) from the query intention analyzer 16, selects items to be presented to the user, and determines in which format they should be presented. In this example, it is determined that "company name", "location", "representative", and "product class" of the item are presented in this order as the output 26 from the output formatter 17.

Figure 7:
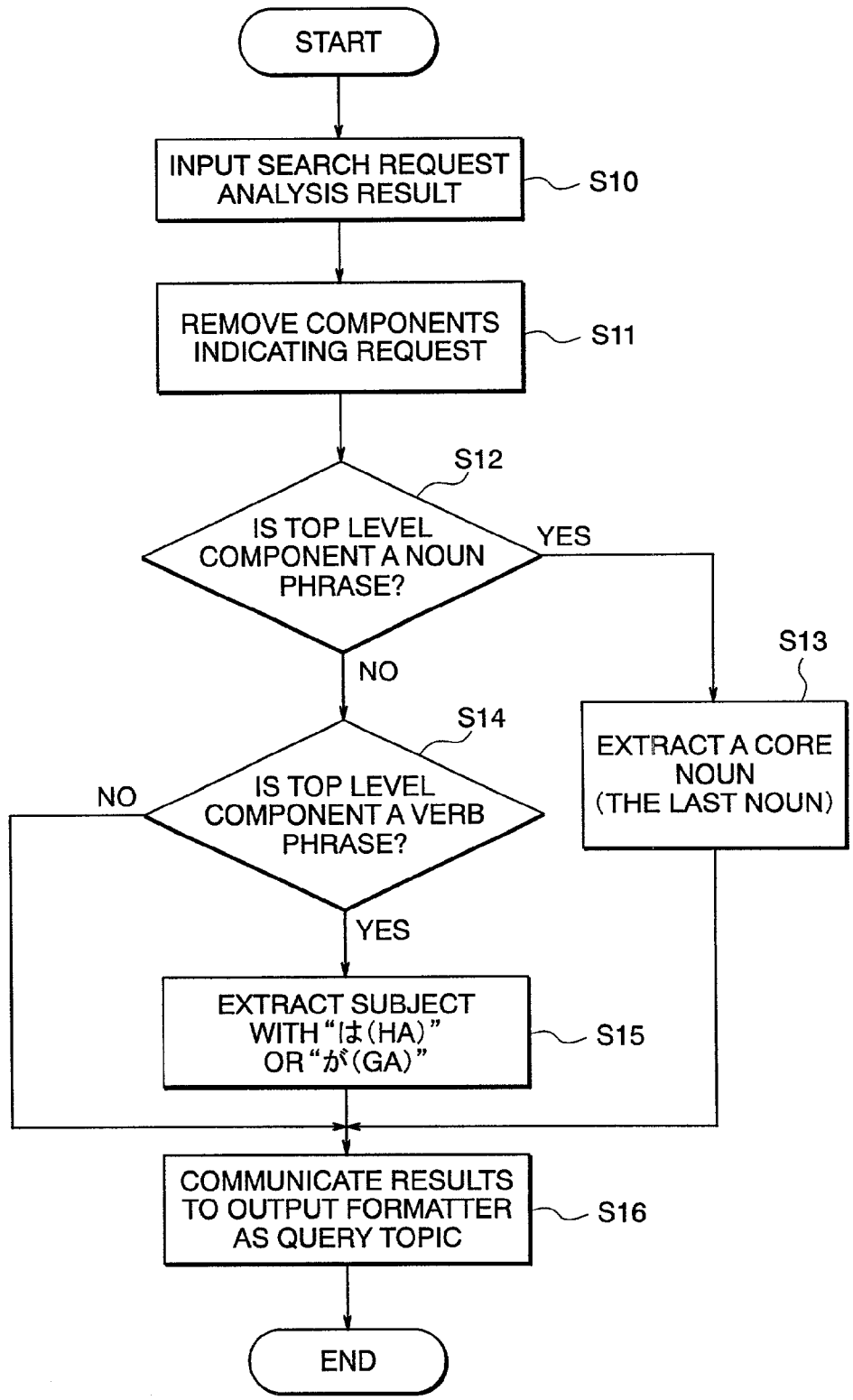
FIG. 7 shows the flow of a process performed by the query intention analyzer.

FIG. 7 shows the flow of a process performed by the query intention analyzer 16. First, the analysis result for the search request is input into the query intention analyzer 16 from the search request analyzer 12 (step S10) Then a phrase indicating a request is excluded from the analysis result (step S11). The phrase indicating a request is "want to find" in "want to find companies selling keyboards", for example.

Then it is determined whether the top level component is a noun phrase (step S12). If it is a noun phrase, the core noun (typically the last noun) is extracted (step S13).

If the top level component is not a noun phrase, it is determined whether it is a verb phrase (step S14). If the top level component is a verb phrase, that is, a predicate, a subject with a postpositional word such as "は (ha)" or "が (ga)" indicative of a subject in a Japanese sentence is extracted (step S15). Finally, the results extracted at steps S13 and S15 are provided to the output formatter 17 as the query topic (step S16).

If no query topic is found, the output formatter 17 is informed of it and outputs search results in a conventional manner without formatting the output according to the present invention.

Figure 8:
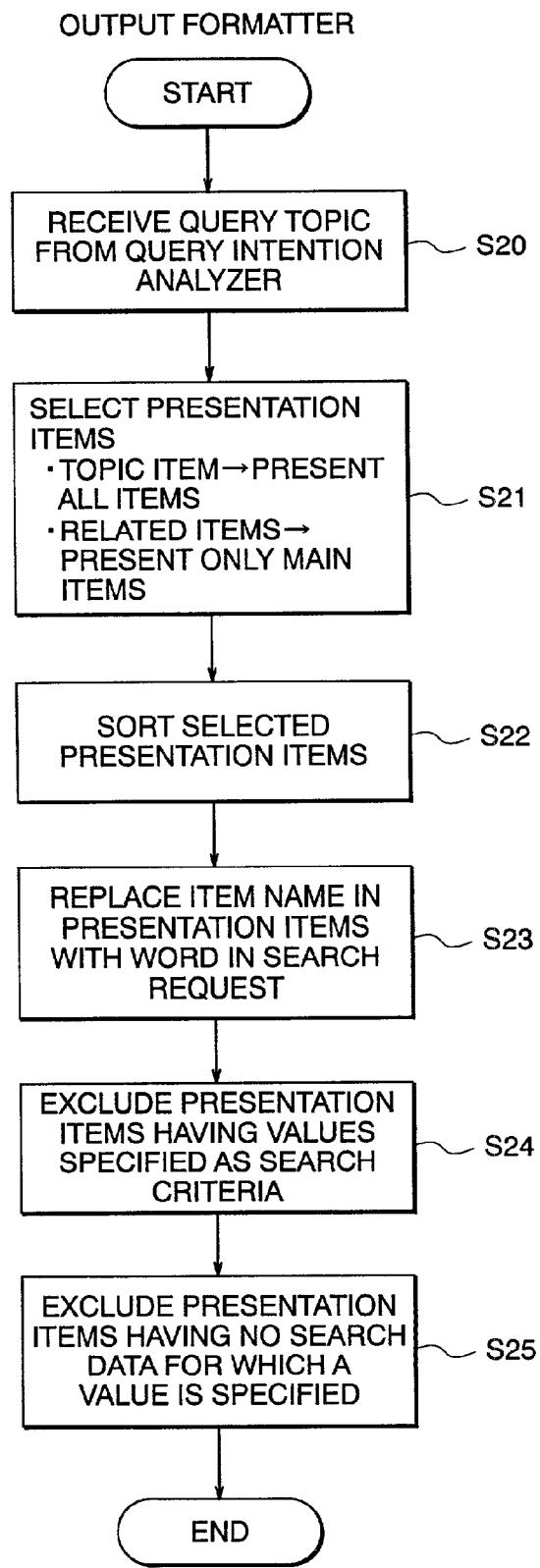
FIG. 8 shows the flow of a process performed by the output formatter.

FIG. 8 shows the flow of process performed by the output for matter 17. The output for matter 17 receives the query topic from the query intention analyzer 16 (step S20) and selects items to be presented as follows (step S21). If an item in the database 15 matches the query topic, all items belonging to the topic item are presented. In particular, if the query topic 25 is "company" as shown in FIG. 6 in a search through the database 15 shown in FIG. 2, all the items (company name, location, and representative) of the company information are selected as items to be presented. Concerning to related items other than the topic item (company information), for example, the product information, "product class" of a main item is selected as an item to be presented. As a result, the company name, location, representative, product class, are selected as items (output items) to be presented, as shown in FIG. 6. The selection of the items to be presented is shown only as an example, so other selection methods may also be used. For example, information about the intention of the query analyzed by the query intention analyzer 16 is used to select items based on selection criteria predefined by the user.

The output formatter 17 then sorts the selected items to be presented (step S22). The topic item and related items to be presented are sorted in this order for the sort of the presented items. If the name of an item in the database 15 is different from a corresponding word extracted from the search request and the search criteria generator 13 replaces the word in the search request with the item name to generate search criteria, the item name in the presentation items is replaced with the word in the search request (step S23). A specific example of this replacement will be described later.

A presentation item for which a value is specified as search criteria is excluded from the selected presentation items (step S24). This is performed because the value of that item is known to the user and therefore there is no need to present the item. Instead of presenting the known value, it is added to the output information as the description of the other presentation items in their entirety.

If the search results in the database 15 do not include search data for which a value is specified, the item is excluded from the presentation items (step S25). This is because it is useless to present the item for which there is no data having the specified value. The result of the output formatting is provided to a presentation module 18 and the presentation module 18 presents it as the final results to the user.

Examples of a query topic and output order will be illustrated below. If search request Q1 is a query, "Which companies sell keyboards?", the query topic would be "company name" because the top level component in the result of the search request analysis is "company". Thus, presentation items, "company name", "location", "representative", "product class", . . . are presented in this order.

On the other hand, if search request Q2 states "Want to know about keyboards currently available", the query topic extracted by the query intention analyzer 16 would be "keyboard". Thus, the output presentation items, "product class", "product name", "price", "company name", . . . are presented in this order.

The search criteria of the search request Q1 are "product class=keyboard", which is the same as that of search request Q2. However the query topics of these requests are different from each other. Therefore different items are selected as search results for presentation.

An example of sorting based on topic items will be provided below. It is assumed that the results of a search performed by the search executor 14 are as follows:

| [Search results] | |
|---|---|
| Company name | Product class |
| Company B Japan | Enhanced electronic keyboard for general use |
| Company A U.S.A. | Transparent keyboard |
| Company B Japan | Sampling keyboard |

| [Search results] | |
|---|---|
| Company name | Product class |
| Musical instrument company C | Electronic keyboard for PC music |
| Company B Japan | Low-price electronic keyboard with capabilities of high-end product |

If the topic is "company name", the following sorting would result.

| [Sorting result] | |
|---|---|
| Company name | Product class |
| Company A U.S.A. | Transparent keyboard |
| Company B Japan | Enhanced electronic keyboard for general use |
| Company B Japan | Sampling keyboard |
| Company B Japan | Low-price electronic keyboard with capabilities of high-end product |
| Musical instrument company C | Electronic keyboard for PC music |

As described above, the output formatter 17 receives a topic item output from the query intention analyzer 16 and sorts a set of searched items based on the topic item. This enables data items having the same topic item value to be arranged adjacently to each other, resulting in a readable presentation.

Figure 9:
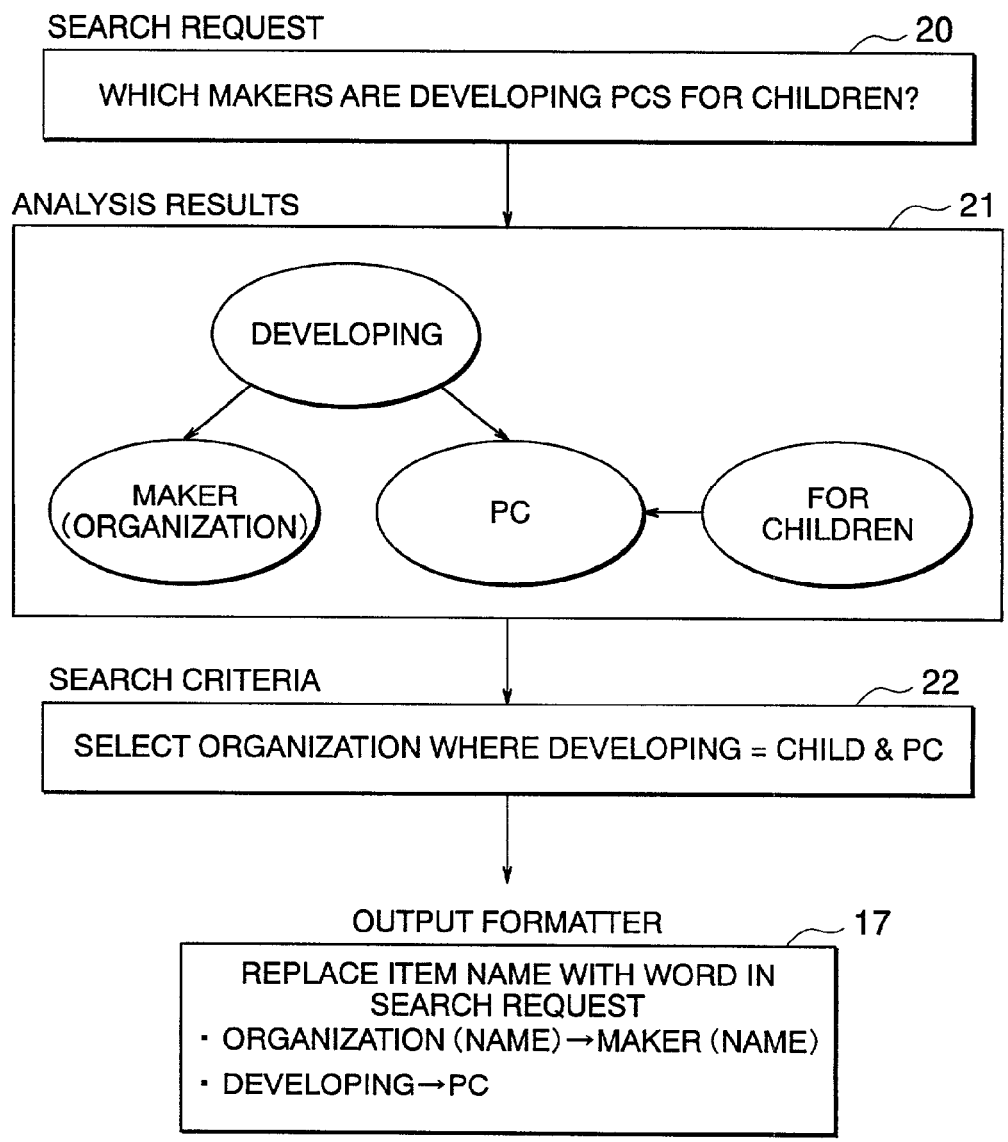
FIG. 9 is a diagram for illustrating the replacement of a word in the search request in the output formatter.

FIG. 9 illustrates the replacement of words in a search request in the output formatter 17 (step S23 in FIG. 8). For example, it is assumed that a query, "Which makers are developing PCs for children?", is provided as a search request 20. The search request analyzer 12 produces analysis results 21. If the database 15 does not contain the item name, "maker", and instead contains an item, "organization", search criteria 22 in which the word "maker" is replaced with the item name "organization" contained in the database 15 are generated by referencing a thesaurus or a word replacement dictionary (not shown) The output formatter 17 replaces the item name "organization" in search result presentation items with the original word "maker" in the search request. This enables a presentation which the user may read easily and insensibly of the items.

As described above, if a user uses words such as "maker" and "personal computer" in a query representing a search request and the database uses different corresponding item names such as "organization" and "product class", item names in the database 15 are replaced with the words used in the user's search request when the information is presented by item, thereby improving the readability of the information.

An example of a process performed by the output formatter 17 at step S24 in FIG. 8 will be described below. Assumption is that a search request is "Want to know about digital cameras from Company A", for example. The search criteria would be "SELECT product information WHERE product class=digital camera company name=Company A", for example.

The output formatter 17 selects items to be presented from the results of this search. "Product class, product name, price and company name" are selected during the first presentation item selection, because the query topic is "digital camera". But, "product class=digital camera" and "company name=Company A" are items having the values specified as search criteria, and these values are common to all the search results, so the presentation of this information is unnecessary. Therefore, these items having the values specified as the search criteria are excluded from presentation items during the second presentation item selection, thereby yielding "product name, price" as presentation items. The neglected values in "product class" and "company name" are collectively provided at the top of the list of the rest of the presentation items as description that qualify the items, if necessary. This avoids displaying redundant items and the information for which a value is specified can be displayed as the description of the rest of the items in the most readable manner.

An example of a process performed by the output formatter 17 at step S25 in FIG. 8 will be described below. Assumed that the first presentation items of search results are "company name, location, representative, product class". All the items contained in the database 15 have not always values, but, for example, the "representative" item fields may be all blank in a data set of search results. In such a case, the output formatter 17 excludes item "representative" from the presentation items to avoid the presentation of useless items containing no information.

For example, if the following first presentation items are provided,

| Company name | Representative | Location |
| --- | --- | --- |
| Company A Japan | ... | Fuchu-machi, Toyama prefecture |
| Factory B | ... | Head quarters, Uozu, Toyama prefecture |
| Research institute C | ... | Joyo, Kyoto | then the "representative" item is removed because it contains no value. The final presentation items would be as follows:

| Company name | Location |
| --- | --- |
| Company A Japan | Fuchu-machi, Toyama prefecture |
| Factory B | Head quarters, Uozu, Toyama prefecture |
| Research institute C | Joyo, Kyoto |

As described above, if search results do not include an entry containing "representative" data and "representative" is selected as a presentation item, the item is excluded from the presentation items to eliminate redundancy, thereby enabling a readable presentation.

An example of an embodiment of the search criteria generator 13 will be described below with reference to FIG. 10. In this example, whether a search will succeed or not is determined before actually executing the search through the database 15, and if it is determined that it will fail, the user is informed of the cause of the failure. For this purpose, an item database containing all the values for the item that are held in the database 15 is provided for each of items in the database 15 that are to be searched through. In the example shown in FIG. 10, a location database (DB) 30, a product class DB 31, and a price DB 32 are provided.

The search criteria generator 3 first generates search criteria through the process described above with respect to FIG. 5 (step S30). Then it checks the criteria of each item as follows. An item specified as criteria is extracted from the generated search criteria (step S31). Then an item database (DBs 30 through 32) corresponding to the specified criteria item is searched for values specified as the criteria (step S32). Based on the result of the search, it is determined whether the value is contained in the item database, DBs 30 through 32, (step S33). If the value is found, the process proceeds to step S35. Otherwise, an alert message is output for informing the user that no entry is found in the database 15 that meets the criteria in the search request (step S34)

The above-described process is repeated for all the search items (step S35). Then, the search executor 14 searches through the database 15. If the alert message is provided to the user at step S35, the search executor 14 does not search the database 15, indicating a search failure.

A specific example of this will be described below. Suppose that a search request, "Want to know about PC makers in the Antarctic", for example, is provided. Then "SELECT company information WHERE product class=PC and location=Antarctic" as the search criteria are generated for this search request. The product class DB 31 is searched for an entry having a specified product class value, "PC" and the location DB 30 is searched for an entry having a specified location value of "Antarctic". As a result of the above-described item DB search, if the entry having the value of "Antarctic" is not found in the location DB 30, "No entry having the maker location "Antarctic was found" is provided as an alert message to the user.

Because it is indicated to the user that no data meeting the criteria "location=Antarctic" is found in the database 15 by the item database search as described above, the user can identify the cause of the search failure.

FIG. 11 shows an example of another embodiment of the search criteria generator 13. In this example, like the example shown in FIG. 10, an item DB containing all the values for the item that are held in the database 15 is provided for each of items in the database 15 that are to be searched through. If no entry that matches a value specified in a search request is found in an item DB, similar entries are retrieved and presented to the user as alternative item value candidates from which the user can make a selection.

The process for generating the first search criteria (step S40), extracting a criteria item from the search criteria (step S41), searching through an item DB (S42), and searching for the value (step S43) is the same as that performed at steps S30 through S33 in FIG. 10.

If an exact match is not found in the item DB through the item-by-item search, the item DB is searched for a value similar to the value (step S44). If a similar value is found in the item DB (step S45), the value is presented to the user to suggest replacing the value specified by the user as criteria with the presented value and prompt the user to confirm the suggestion. If a plurality of similar values are found, all of them are presented to the user so that the user can select one from them. If the user accepts the selection of a value, the search criteria are modified accordingly (step S46). Steps S41 through S46 are repeated for all criteria items in the search criteria generated at step S40 (step S47). Then, the search criteria are provided to a search executor 14 for executing the search.

A specific example of this will be described below. Suppose that a search request, "Want to know about instruments developed by マイクロハード(maikurohado)", is provided, for example. Then, a search command in which search criteria, "SELECT product information WHERE product class=instrument and company name=マイクロハート" is specified, is generated. An item DB (company name DB) is searched for an entry having the specified company name, "マイクロハート". If the entry is not found, the item DB is further searched for an entry having a value similar to the specified value, "マイクロハート".

The similar value may be provided by transliterating "マイクロハート" to a word, "Maikurohado", written with Roman letters. Then, the item DB is searched by using "Maikurohado" as a key. If "Microhard" is found as the most similar entry, the following alert message and a message for alternative value confirmation are provided to the user:

"No entry having the value "マイクロハート" was found."

"A similar value "Microhard" was found. Do you replace your search criteria with this value and continue the search?"

If the user accepts this alternative criteria, the search criteria in the search command are modified as follows:

"SELECT product information WHERE product class=instrument and company name=Microhard". Then the search command is provided to the search executor 14.

As described above, if no entry matches the organization name, "マイクロハート", written in Katakana and the company name, "Microhard", which is written in Roman characters and has similar pronunciation, is found in the item DB, the modification of the search criteria is suggested to the user and search results that the user wants to obtain can be presented to the user.

FIG. 12 shows an example of another embodiment of the search criteria generator 13. In this example, the search criteria generator 13 presents to the user an alternative value to be specified for an item, and, if it is accepted by the user, the pair of an originally specified value and the alternative value are stored as synonymous words in an item and may be used in generating search criteria for the subsequent search requests to automatically widen the criteria.

First, the search criteria generator 13 generates search criteria (step S50). The process at step S50 is the same as that at steps S40 through S47 in FIG. 11. Then, the search criteria generator 13 determines whether a thesaurus is available or not (step S51) and, if the thesaurus is available, it is used to widen the search criteria (step S52).

It also determines whether the search criteria have been modified using an alternative criteria (at step S46 in FIG. 11) (step S53), and if modified, presents the alternative criteria to the user (step S54) to ask the user whether the user accepts the input of the criteria into the thesaurus. If the user accepts the input (step S55), the alternative criteria, that is, the pair of the originally specified value and the alternative value, are entered into the thesaurus (step S56).

A specific example of this will be described below. It is assumed that the search criteria, "Want to know about instruments developed by マイクロハート" in the above-described example are provided and the alternative criteria in which "マイクロハート" in the search criteria is replaced with "Microhard" are accepted by the user. At step S56 in FIG. 12, the pair of "マイクロハート" and "Microhard" are entered into a thesaurus. Then, if a search request, "What kind of disk drive is developed by マイクロハート?", are provided, a search command that "SELECT product information WHERE product class=disk drive and company name=マイクロハート" are specified as a search criteria is first generated. Then the thesaurus is referenced and the search criteria are widened as follows:

"SELECT product information WHERE product class=disk drive and company name=マイクロハート or Microhard" (step S52 in FIG. 12).

As described in this example, if the user accepts the replacement of "マイクロハート" with "Microhard", the pair of these words are entered into the thesaurus. When the user inputs "マイクロハート" in the subsequent processes, "Microhard" is searched for besides "マイクロハート" through widening criteria by using the thesaurus, thereby allowing search results desired by the user to be presented in the subsequent searches without an acceptance procedure by the user.

An example which the search executor 14 repeats the search mentioned below will be explained. The search criteria generator 13 generates the search criteria for the first search to be performed by a search executor 14. It is determined whether the search by a search executor 14 has succeeded or not, considering number of the search result. If it is determined that the search has failed, the search criteria are widened so as to increase the number of searched sets. Further the search is repeated by the search executor 14 until the search succeeds or further widening of the search criteria becomes impossible.

Figure 13A:
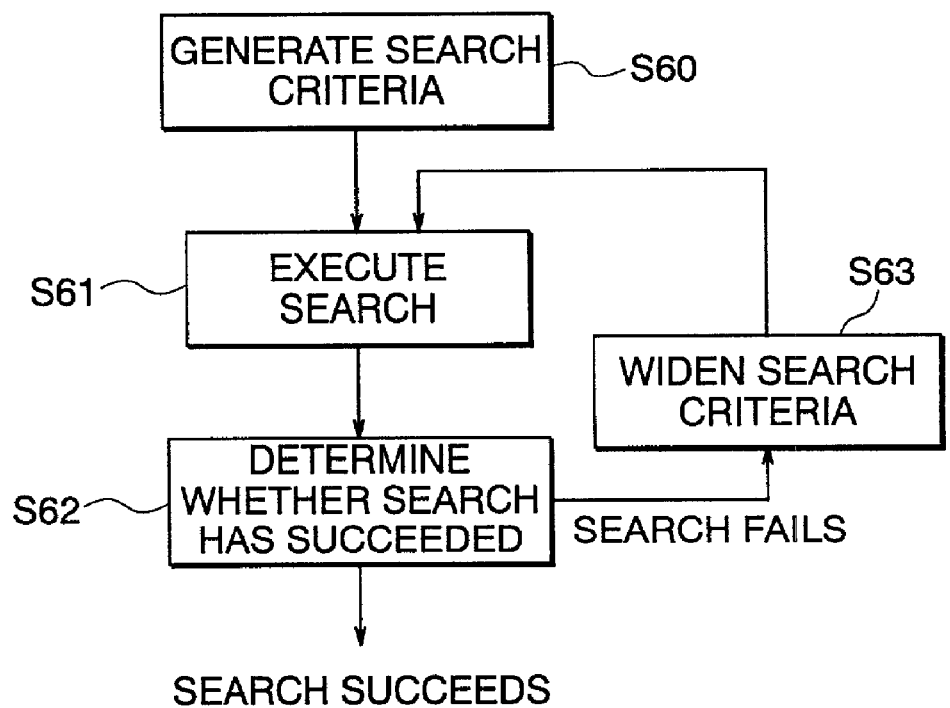
FIG. 13A illustrates an example of search criteria widening.

FIGS. 13A and B illustrate the example of search criteria widening. As shown in FIG. 13A, when search criteria are generated in the search criteria generator 13 (step S60), the output from the search criteria generator 13 is provided to the search executor 14, where the search is executed (step S61). It is determined whether the search has succeeded or not (step S62), and, if it is determined that the search has succeeded, the search process will end. If it is determined that the search has failed, a process for widening the search criteria is performed in a search criteria widening section (not shown) in the search criteria generator 13 (step S63) and the search is performed again by the search executor 14. The process continues until the search succeeds or further widening of the search criteria becomes impossible.

Figure 13B:
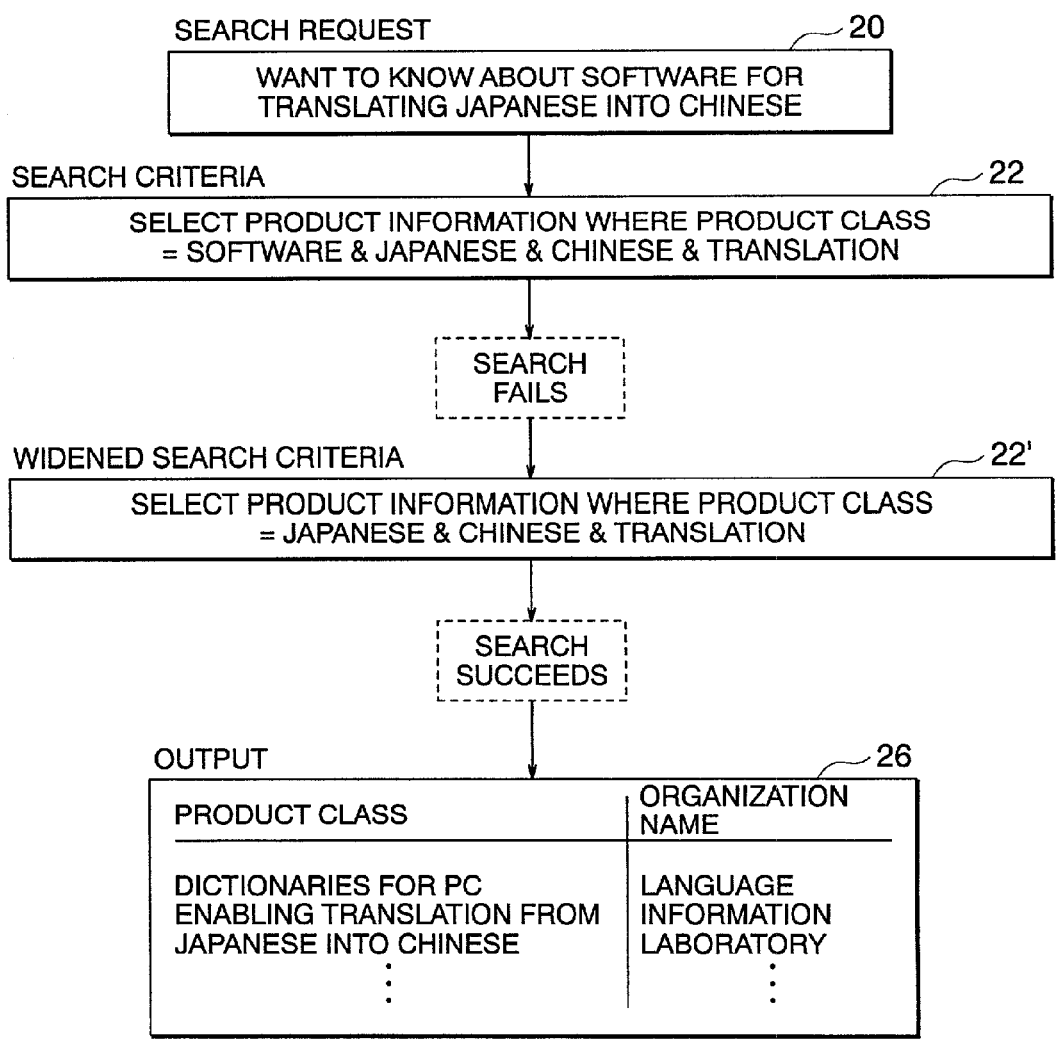
FIG. 13B illustrates an example of search criteria widening.

Suppose that a search request 20 is "Want to know about software for translating Japanese into Chinese" as shown in FIG. 13B. Then the search criteria generator 13 first generates a search command in which "SELECT product information WHERE product class=software and Japanese and Chinese and translation" of search criteria 22 are specified based on the result of an analysis by a search request analyzer 12 and sends it to the search executor 14. If the search fails because no data meeting the search criteria is found when the database 15 is searched for by the search executor 14, keywords are removed from the product class one by one, the leftmost first, to widen the search criteria. For example, "software" of the keyword is removed from the search criteria and the search is performed again by the search executor 14 based on "SELECT product information WHERE product class=Japanese and Chinese and translation" as a search criteria 22. If the search succeeds, a query topic is extracted by a query intention analyzer 16, presentation items are selected by an output formatter 17, then the search results such as an output 26 are presented to the user.

The probability of success of a search increases because the search criteria are automatically widened by removing "software" of the first keyword, and the search is executed again if the search fails because the first criteria specified ("software and Japanese and Chinese and translation) is too narrow, as described above. Furthermore, if the search fails, the next keyword, "Japanese", is removed from the criteria similarly and entries that meet the criteria are searched for.

Figure 14A:
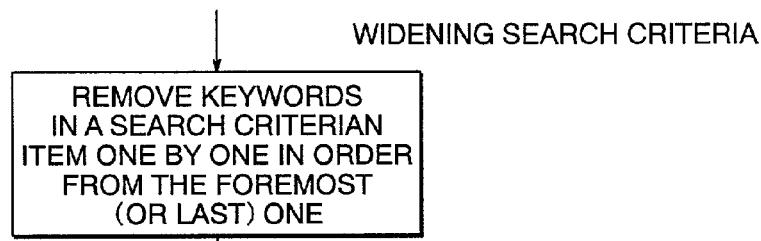
FIG. 14A shows different examples of the method for widening search criteria.

FIGS. 14A, B and C show different examples of the method for widening search criteria. In an example shown in FIG. 14A, keywords in a search criteria item are removed one by one in order from the foremost (or the last) one like the example described with respect to FIG. 13B.

Figure 14B:
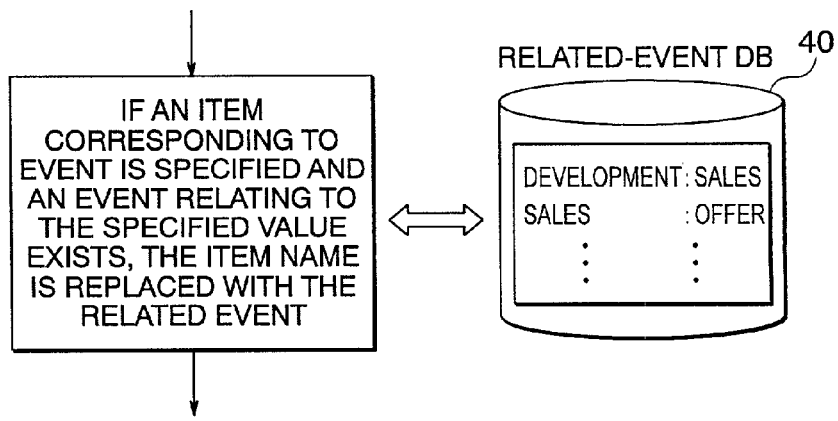
FIG. 14B shows different examples of the method for widening search criteria.

An example shown in FIG. 14B has a configuration in which a related-event DB 40 related to a particular item is provided and a particular item in a database to be searched is associated with a particular event. In this configuration, the related-event DB 40 is referenced and the value specific for a particular item is extended to a value specific for an item associated with an event relating to an event associated with that item. That is, if an item associated with an event is specified as search criteria and an event relating to that specified value exists, the name of the item is replaced with the related event.

Suppose that a search request states "Want to know about robots developed by Company A Japan." Then the search criteria generator 13 generates a search command in which the following search criteria are specified.

"SELECT product information WHERE product class=robot company name=Company A Japan event type=development"

If the search based on this search criteria fails, a related event, "sales", is retrieved from the related-event DB 40 and "development" in the search command is replaced with "sales" to widen the search criteria. As a result, the search is re-executed by using the following command.

"SELECT product information WHERE product class=robot company name=Company A Japan event type=sales"

Thus, in response to the search request, "Want to know about robots developed by Company A Japan", development events whose subject is Company A Japan are searched for, and if the search fails, the criteria widening operation is performed by using a related event to generate a search criteria that "development" of the event type is replaced with "sales" because the related-event DB 40 contains "sales" of the event relating to "development" of the original event. Therefore, robots sold by Company A Japan are searched for instead of robots developed by Company A Japan.

Figure 14C:
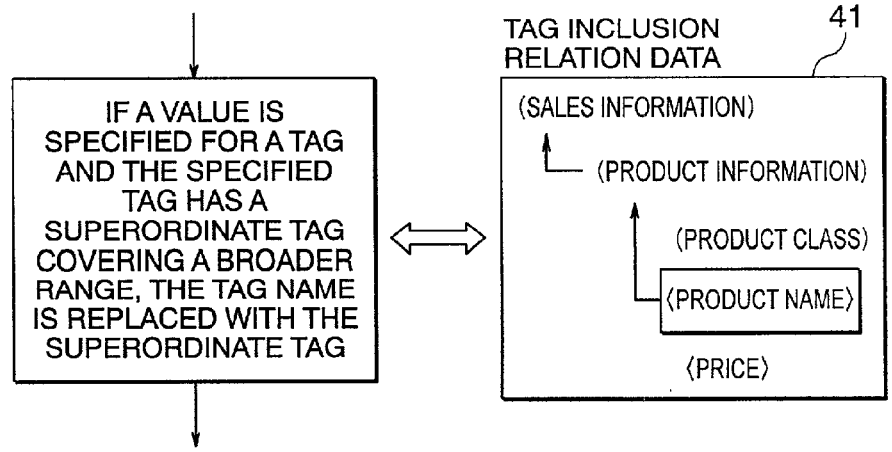
FIG. 14C shows different examples of the method for widening search criteria.

FIG. 14C shows an example of widening search criteria in which a database 15 to be searched is composed of tagged structured text such as XML. When the text-base database structured using tag information is searched, user's search request is eventually converted into value specific for each tag item.

In this embodiment, tag inclusion relation data 41 indicating inclusion relation of tags is provided beforehand. The tag inclusion relation data 41 may be data that <product information> has <sales information> as a superordinate conception, and <product class>, <product name>, and <price> as a subordinate conception, for example. In this example, if a value is specified for a tag and a specified tag has a superordinate tag that covers a broader range, the name of the tag is replaced with the superordinate tag.

Suppose that the following search criteria are generated initially.

"SELECT sales information WHERE company name=Company A Japan product name=medical software"

If a database 15 is searched based on this search criteria and the search fails, "product name" is replaced with "product information" to widen the search criteria, because "product information" which is the superordinate tag of "product-name" covers a broader range including "productname".

"SELECT sales information WHERE company name=Company A Japan product information=medical software"

As mentioned above, a tag in the search criteria is replaced with its superordinate tag that covers a broader range to widen the search criteria. This criteria widening can address a case where a wrong tag is inserted in search criteria due to an error in tag analysis.

Figure 15:
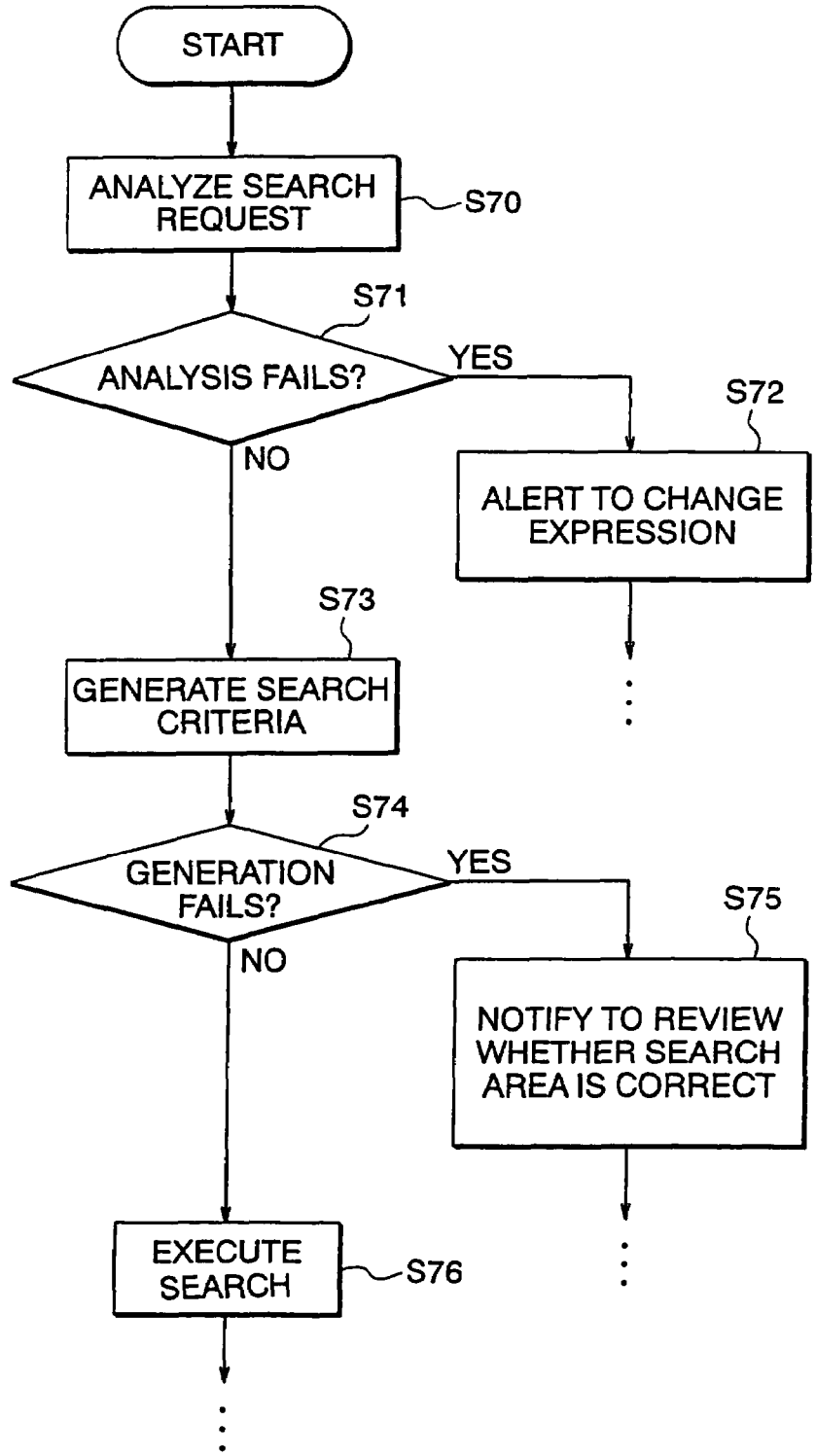
FIG. 15 shows an example of a process for confirming a search area.

FIG. 15 shows an example of a process for prompting a user to review a search area when it is found in advance that a search will fail. First, in response to a search request input by the user, a search request analyzer 12 analyzes the search request (step S70). If the analysis fails due to an ambiguous expression in the search request (step S71) an alert message is provided to the user to prompt the user to change the expression (step S72). If the search request is analyzed successfully, then a search criteria generator 13 generates search criteria (step S73). If the generation of the search criteria fails due to the presence of an unknown word, for example (step S74), a notifying message is provided to the user to prompt the user to check to see if the search area is correct (step S75). If the search criteria are generated successfully, a search executor 14 performs the search (step S76).

Suppose that the search request states "Want to know about recent earthquakes in India". If the generation of search criteria fails because the analysis of the search request yields a result, "<time> recent </time> <unknown word> earthquakes in India </unknown word> <search request> want to know about </search request>", which contains the unknown word, "earthquakes in India", an alert message is output for prompting the user to check to see if the area of the query is correct. Here, an unknown word is a word that is not contained in the analysis dictionary 23 described earlier with respect to FIG. 4 or a word that does not have a corresponding word in a database 15.

Figure 16:
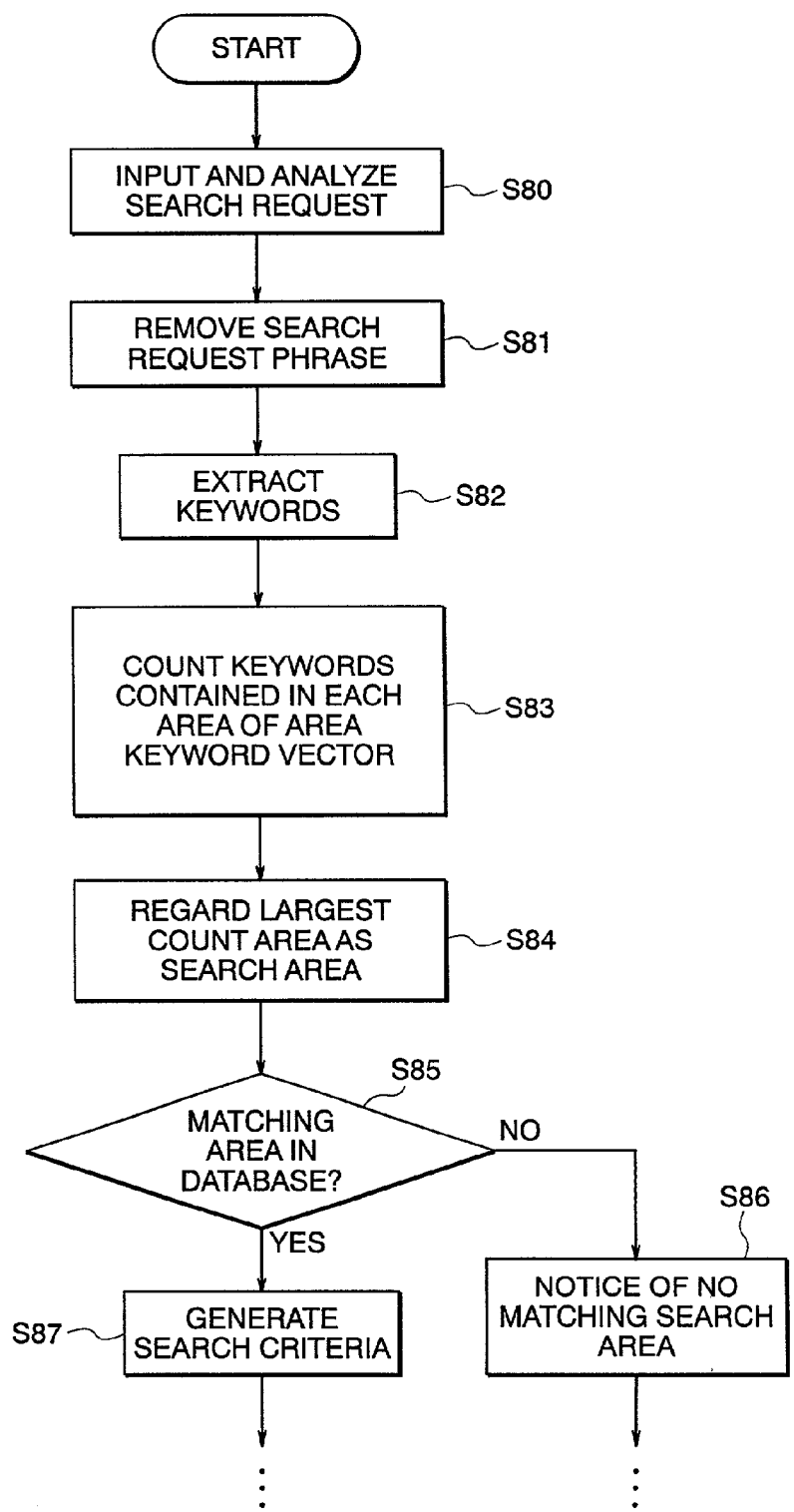
FIG. 16 shows an example of the determination of the search area.

FIG. 16 shows an example of a process for determining a search area, wherein a list of keywords unique to each of various areas is provided beforehand, the list is used to determine the area of a search request, and, if it is determined that the search request is in an area that is not addressed by a system, an alert is provided to the user to inform the user that the area is not addressed by the system.

A search request is input and analyzed in a search request analyzer 12 (step S80), and a search request phrase is removed (step S81). Then keywords are extracted (step S82) and keywords that are contained in each area of an area keyword vector are counted (step S83). The area keyword vector is pre-registered data indicating whether or not a keyword relates to any of various areas such as "politics", "economy" and "sport". For example, it indicates that keywords such as "baseball", "golf", and "player" belong to or closely relate to the "sport" area.

Keywords appearing in the search request are counted on an area basis and the area containing the most keywords is regarded as the search area (step S84). It is determined whether the search area matches an area in a database 15 that is to be searched (step S85) and, if it does not match any of the areas in the database, an notifying message is provided to the user to indicate that there is no matching area (step S86). If it matches an area in the database, a search criteria generator 13 generates search criteria (step S87).

Figure 17:
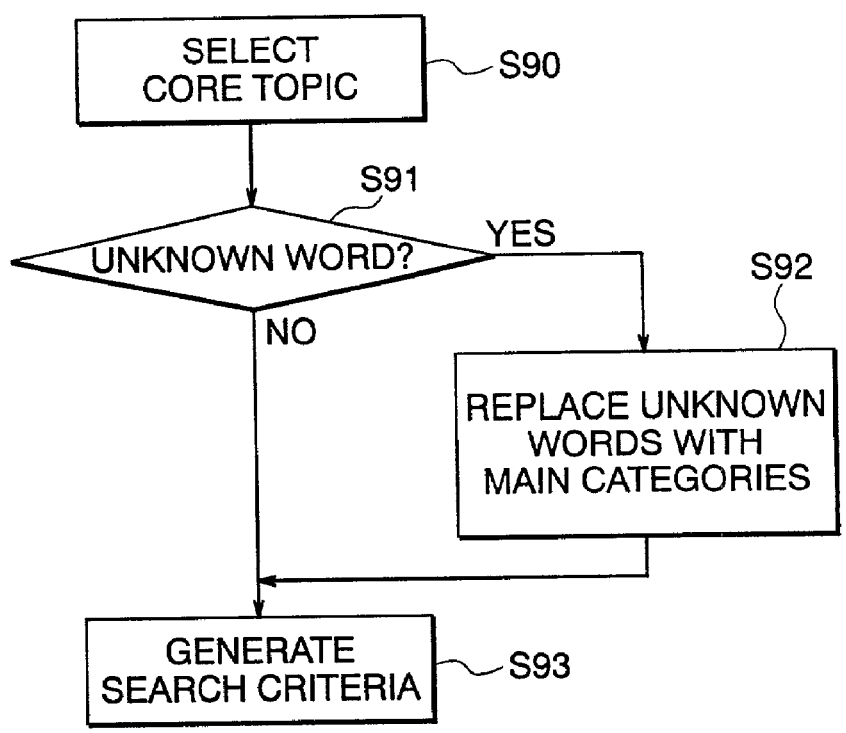
FIG. 17 shows an example of another embodiment of the search criteria generator.

FIG. 17 shows an example of another embodiment of the search criteria generator 13. In this example, if an unknown word topic is found in a search request, search criteria for items on a main item list which is provided in advance are generated for that unknown topic, a search is performed in each item, and the results are presented to the user.

First, a core topic of a query is selected from the results of the analysis of the search request (step S90). Then, it is determined whether the topic is an unknown word (step S91). If it is an unknown word, it is replaced with a main category (step S92). A main category is an item placed on the main item list in advance. Typically, a plurality of items are included in the main item list. Then, search criteria are generated in which any unknown word is resolved (step S93)

For example, suppose that the search request is "Want to know about an access" and a search request analyzer 12 outputs "<unknown word> access </unknown word> <search request> want to know about </search request>". Because the <access> is an unknown word, it is unknown under which item the "access" falls as a specified value. If the main item list includes "company name" and "product class", category for <access> are assumed one by one to generate search criteria as follows.

When "access" is assumed to be an organization, search criteria, "SELECT company information WHERE company name=access", is generated, and when "access" is assumed to be a product, search criteria, "SELECT product information WHERE product class=access", is generated.

As described above, if a search criteria generator 13 fails to generate search criteria for the search request that is "Want to know about an access", under items in a database, the search criteria generator 13 generates search criteria in which a criterion part is assumed to fall under a main item contained in the database. That is, if "organization" and "product" as main items are contained in the database, two searches are performed: one in which "access" is assumed to be a company name and one in which "access" is assumed to be a product name. Then the results are presented to the user.

Figure 18:
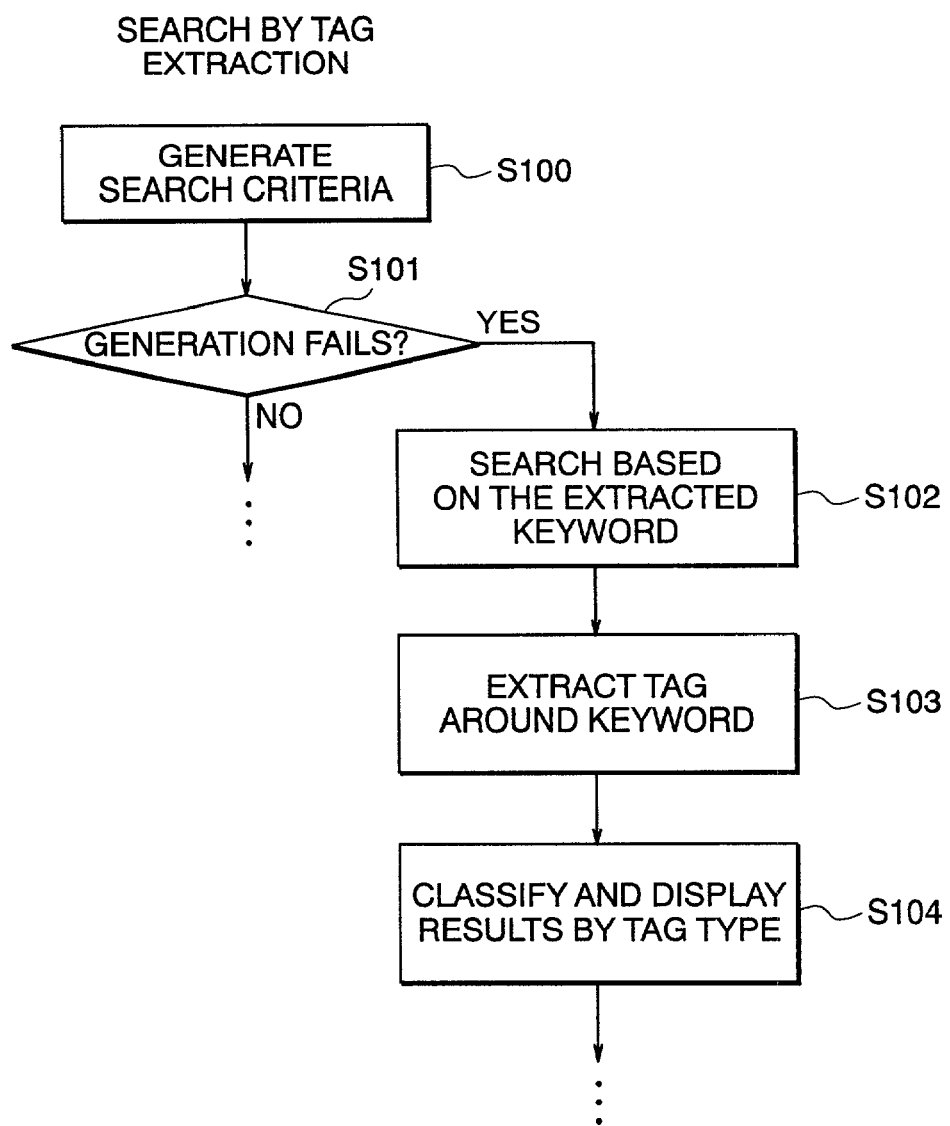
FIG. 18 shows an example of another embodiment of the search generator and a search executor.

FIG. 18 shows an example of another embodiment of the search criteria generator 13 and search executor 14. In this example, a database 15 to be searched is a text base structured by using tags. If the analysis of a search request yields a query about a word for which no tag is specified, the word is first used to perform a simple keyword search without tags, then the results of the search are classified by tag applied to words and presented to the user.

First, a search criteria generator 13 generates search criteria (step S100). If a tagged word is inquired about and the analysis of the correspondence between an item and the specified value fails and therefore no search criteria can be generated (step S101), a keyword is first extracted from the search request and the extracted keyword is used to perform a simple search through a database 15 without a tag (step S102). A tag near the keyword used, that is, a tag covering a small area including the keyword, is extracted from the results of the search (step S103), then the search results are classified by tag and presented to the user (step S104).

An example of a text complement process during the entry of text into a database 15 will be described below with respect to FIG. 19. It is assumed that the database 15 to be searched is composed of text data structured using tags, such as XML. Secondary databases (DBs) are provided for essential tags. A correspondence table 50 indicating correspondences between tags and the secondary databases is also provided as shown in FIG. 19A. In this example, a secondary database DB2 as shown in FIG. 19B is provided for a tag of "representative" and another secondary database DB3 is provided for a tag of "location."

Figure 20:
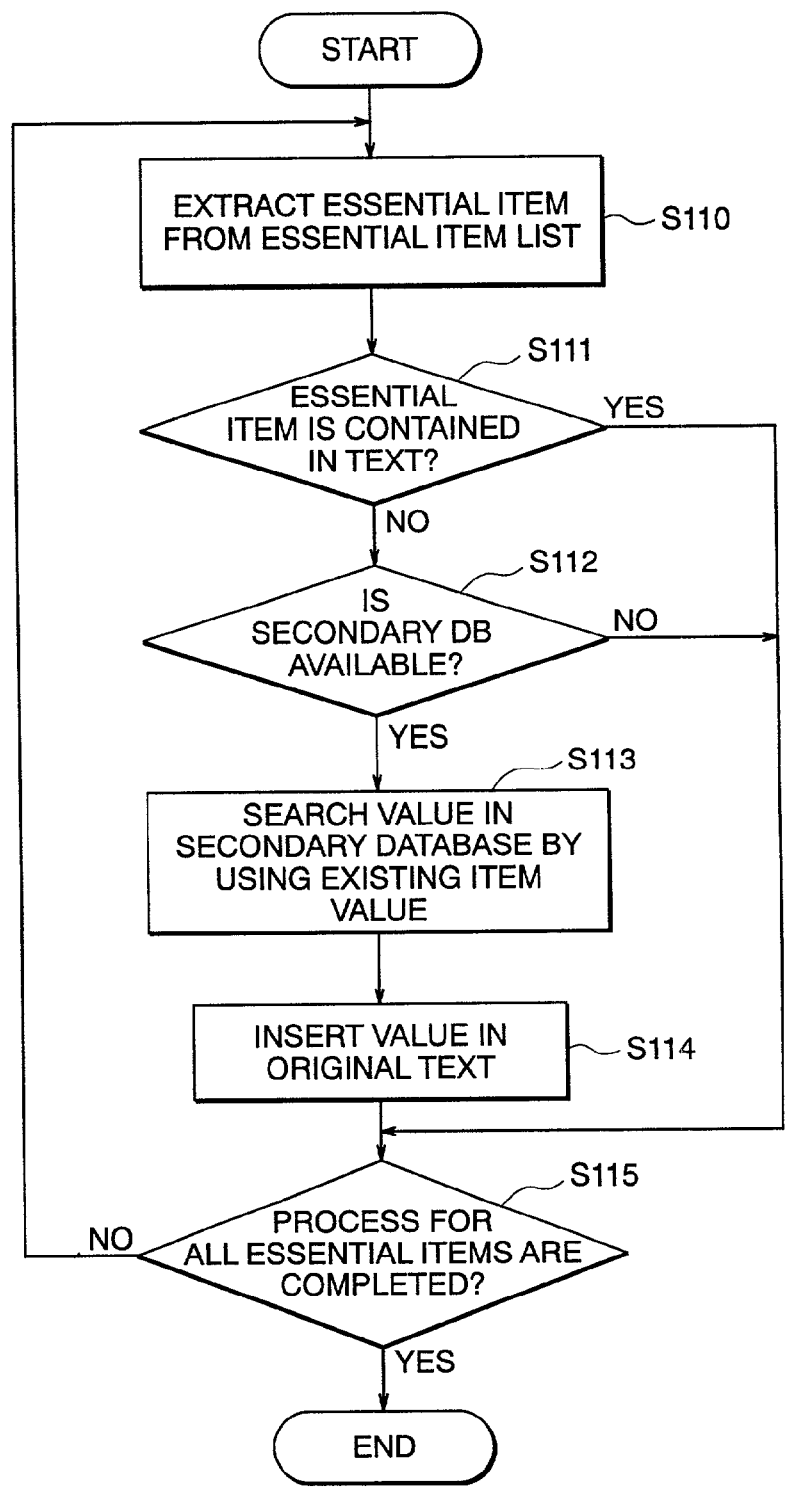
FIG. 20 shows the flow of a process for entering the text into the database.

Also provided is an essential item list 51 containing essential items relating to subjects covered by the database 15 to be searched for performing a process shown in FIG. 20 during the entry of text into the database 15.

First, an essential item is extracted from the essential item list 51 (step S110). Then, it is determined whether the essential item is contained in text to be entered in the database 15 (step Sill). If the text data to be entered concerns "organization", then items "organization name", "location", and "representative" would be essential items. On the other hand, if it concerns "product", items "product class", "product name", and "price" would be essential items. If the text contains organization name information and does not contain representative and location information, the correspondence table 50 between tags and secondary DBs is referenced to determine whether there are secondary databases for representatives and locations (step S112). In the example shown in FIG. 19, there are secondary databases DB2, DB3 for them, therefore secondary databases DB2, DB3 are searched for a representative and location associated with an organization name and a location contained in the text, respectively (step S113), and retrieved values are inserted into the original text to be entered in the database (step S114).

Thus, if the text to be entered is "<organization name> Factory A </organization name>" as shown in text 52 in FIG. 19D, Complementing the data is executed by using the secondary databases DB2, DB3 and "<organization name> Factory A </organization name> <representative> President Yamazaki </representative> <location> Kawasaki </location>" as shown in text 53 in FIG. 19E is actually entered in the database 15.

The above-described process is repeated for all essential items on the essential item list 51 (step S115).

Figure 21:
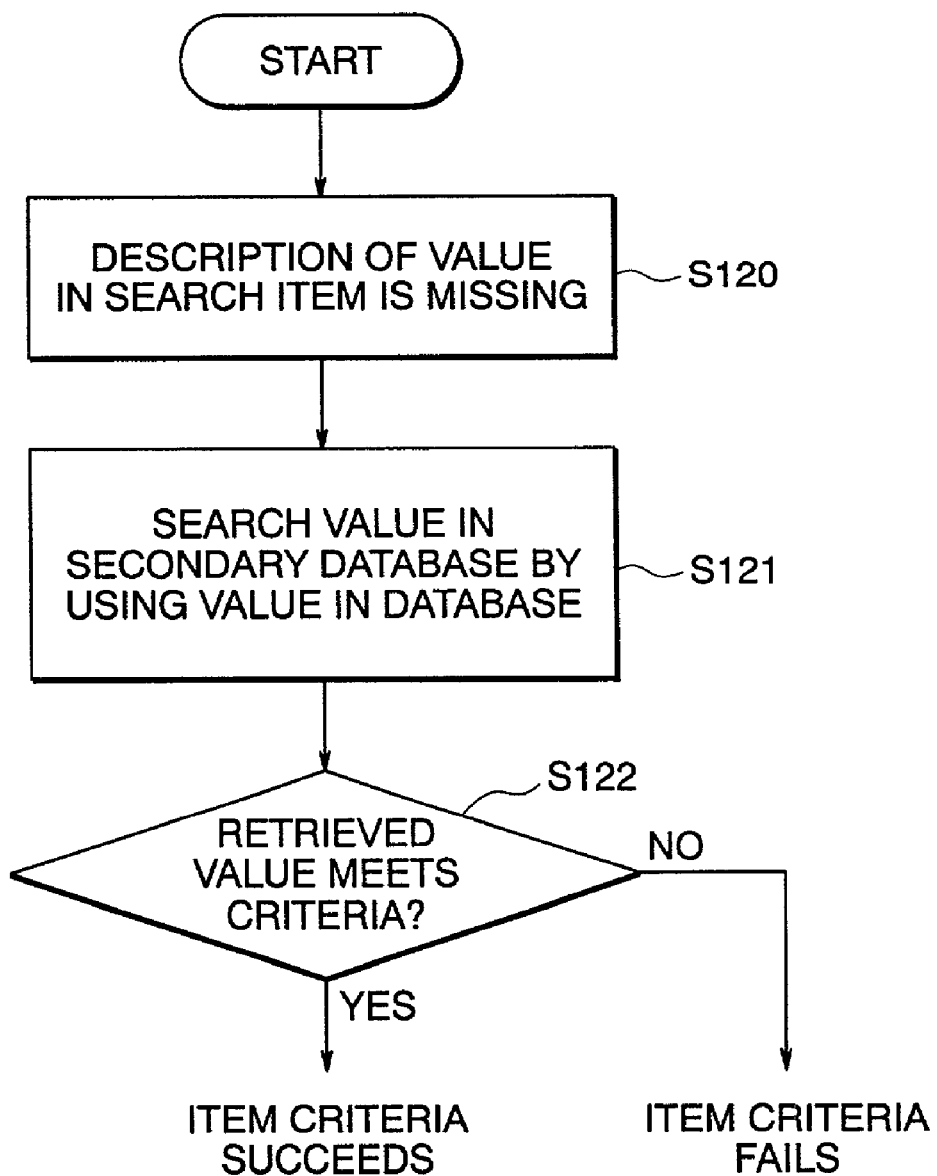
FIG. 21 shows an example of a process for using a secondary database during a search.

FIG. 20 shows a process to complete data during the entry of the text data in a database. However missing data may be added during a search process by using secondary databases FIG. 21 shows an example of this.

First, if it is detected that the description of a value in a search item is not contained in a database 15 (step S120), the secondary databases is searched for a key item by using a value in the database 15 (step S121). The process will be described by using an example in which secondary databases similar to those in the example in FIG. 19 are provided. If the database 15 contains data, "Factory A", and does not contain information about its representative and location, the information about the representative and location is retrieved from secondary databases. This information is used to determine whether a retrieved value meets criteria (stepS122) If it meets the criteria, the item criteria are considered to have succeeded. Otherwise, the item criteria are considered to have failed.

For example, in response to a search request that is "Find companies selling printers located in Kawasaki", a search criteria generator 13 generates the following search criteria:

"SELECT company information WHERE location=Kawasaki and product class=printer".

Then it is determined whether there is a secondary database for each item in the search criteria. If a secondary database DB3 as shown in FIG. 19B is found for "location", the location criterion in the search criteria is used to search the secondary database DB3 and search results such as "Factory A", "Company C", . . . are obtained from the database 15. The results are checked to see if they meet the other criteria (product class=printer") and obtain "Factory A". Search sets are summed to obtain final search results.

If a database to be searched is a text base structured with tags, values for individual items may be extracted and first entered in individual databases during the entry of text into the text database, then a group of spellings resembling each other may be extracted from the individual databases after the completion of the entry, thereby enabling a precise detection of variations in notation compared with that in a case where the entire text is searched.

As described above, according to the present invention, the results of a search through a database performed in response to user's request are reduced to an appropriate quantity, formatted according to user's requirements, and provided in organized, readable form.

What is claimed is:

1. A query-and-response processing method for receiving a search request concerning a query input by a user and searching a database to present search results to the user, the method comprising:

analyzing a search request sentence provided by said user using syntactic parsing;

analyzing an intention of the query based on the analyzed search request sentence, wherein the analyzing comprises:

determining whether said search request sentence includes an interrogative pronoun, and extracting, as a topic of query, either a top level component of syntactic hierarchy of said search request sentence, in a case said search request sentence does not include an interrogative pronoun, or a component qualified by an interrogative pronoun, in a case said search request sentence includes the interrogative pronoun;

generating search criteria based on said topic of query extracted in said analyzing the intention of query;

searching said database using said generated search criteria and retrieving, as search results, information that are intended for said topic of query;

determining an output format of search results based on said topic of the query without further input by the user; and outputting said search results that are selected items to be presented to the user.

2. The query-and-response processing method according to claim 1, wherein:

said analyzing the query intention comprises determining a topic item, said topic item being a core topic of the search request; and said determining an output format of search results comprises selecting an item to be presented to said user based on the determination as to whether or not the item is the topic item.

3. The query-and-response processing method according to claim 2, wherein said determining an output format of search results comprises processing information by ordering the search results of the presentation items.

4. The query-and-response processing method according to claim 2, wherein said determining an output format of search results comprises adjusting a level of detail of the presentation to provide all specific items or only main items relating to a particular subject.

5. The query-and-response processing method according to claim 2, wherein said determining an output format of search results comprises classifying the search results according to specified item values to organize by category the information to be presented to the user.

6. The query-and-response processing method according to claim 1, wherein said determining an output format of search results comprises using data specifying an item relating to a particular item to add the item relating to the particular item to the items to be presented, after the items to be presented to said user are determined.

7. The query-and-response processing method according to claim 1, wherein:

said generating search criteria comprises storing information about correspondence between a word used for specifying search criteria in an item in the database and an item name in the database; and said determining an output format of search results comprises replacing said item name in the database with said word to present said search results.

8. The query-and-response processing method according to claim 1, wherein:

said generating search criteria comprises determining an item under which a value is specified as search criteria; and said determining an output format of search results comprises removing an item used as the search criteria from presentation items after the presentation items are determined and adding the value of said item to the presentation items as a description of said presentation items.

9. The query-and-response processing method according to claim 1, wherein an item under which a value is specified and for which no search data is included in the search results is excluded from presentation items during the selection of the presentation items at said determining an output format of search results.

10. The query-and-response processing method according to claim 1, wherein said generating search criteria comprises:

providing an item database containing all the values in a particular item that are held in a database to be searched; and, if a specified value in criteria specification generated for an item is not contained in said item database, providing an alert to the user for indicating a search failure and the cause thereof before executing the entire search process.

11. The query-and-response processing method according to claim 1, wherein said search criteria generation comprises:

providing an item database containing all the values in a particular item that are held in a database to be searched; and, if no entry in said item database matches a specified value in the item in the search request, searching for entries having values similar to the specified value and presenting said similar values to the user as alternative value candidates from which the user can make a selection.

12. The query-and-response processing method according to claim 11, wherein said generating search criteria comprises presenting to a user an alternative to a specified value in an item, and, if said alternative is accepted by said user, storing the pair of the originally specified value and the alternative as synonymous words for the value in an item to use said pair to automatically widen criteria during the generation of search criteria.

13. The query-and-response processing method according to claim 1, wherein said generating search criteria comprises:

generating search criteria to be first used in said searching;

determining whether the search succeeds or fails based on the number of results of the search performed at said searching;

widening the search criteria so as to increase the number of search sets upon determining the search fails; and widening the search criteria and repeating the search until the search succeeds or the search criteria become unable to be widened.

14. The query-and-response processing method according to claim 13, wherein, if an item in the database to be searched is configured so as to correspond to a particular event, value specification for a particular item is extended to value specification for an event relating to the event associated with said item to widen search criteria.

15. The query-and-response processing method according to claim 13, wherein if the database to be searched is composed of structured text and the search criteria generated specify a structure tag and corresponding text, said structure tag is replaced with a tag covering broader text range in a tag hierarchy to widen the search criteria.

16. The query-and-response processing method according to claim 1, wherein:

if the analysis at said analyzing a search request fails, an alert concerning the form of the search request is provided; and it is determined whether or not an item extracted as a topic in the search request at a generating a search request corresponds to an item in the database to be searched, and, if an analysis of the correspondence fails, an alert is provided to the user indicating that the query is outside the scope of the system.

17. The query-and-response processing method according to claim 1, wherein a list of keywords unique to each of various areas is provided and the list is used to determine the area of the search request at said analyzing a search request; and if it is determined that the area of the search request is not addressed by the system, an alert is provided to the user for indicating that the query is outside the scope the system.

18. The query-and-response processing method according to claim 1, wherein search criteria, for an item on a main item list provided in advance, are generated for a topic in the search request for which no correspondence to an item in the database is found at said generating search criteria and further comprises repeating the search in each of the main items and presenting the search results to the user.

19. The query-and-response processing method according to claim 1, wherein the database to be searched is a text base structured with tags, and if the analysis of a search request shows that the query is about a word without tag, the word is first used to perform a simple keyword search without tag and the results of the search are classified by tag added to words to be searched to present the results to the user.

20. The query-and-response processing method according to claim 1, wherein the database to be searched is a text base structured with tags and, when text to be searched is entered into the database, a provided list of items essential to a subject covered by the text base is referenced to determine whether an essential item of one of items constituting a subject of the text to be entered is described in the text, and, if it is determined that the essential item is missing, a secondary database provided for the missing item is searched by specifying a value for a key item of the subject in said text to be entered and said text is complemented with a value obtained.

21. The query-and-response processing method according to claim 1, wherein, if a main database composed of a text base structured with tags and a secondary database holding values of tags contained in the main database are provided as databases to be searched, upon the secondary database relating to an item in search criteria, the secondary database is first searched by specifying a value for an item to be searched for, a list of values for a key item is generated from a search set obtained, and then the list is replaced with a value specified for the tag to search through the main database.

22. The query-and-response processing method according to claim 1, wherein, if the database to be searched is a text base structured with tags, values for individual items are extracted and entered into individual databases at the same time when text to be searched is entered into the database, and a group of spellings resembling each other is retrieved from each of the individual databases after the completion of the entry to enable a precise detection of variations in notation compared with that in a case where the entire text is searched.

23. A computer readable medium containing a query-and-response processing program for receiving a search request concerning a query input by a user and searching a database to present search results to the user, said program performing:

a search request analysis process analyzing a search request sentence provided by said user using syntactic parsing;

a query intention analysis process for analyzing an intention of the query based on the result of the analysis of said search request sentence, wherein the analyzing comprises:

determining whether said search request sentence includes an interrogative pronoun, and extracting, as a topic or query, either a top level component of syntactic hierarchy of said search request sentence, in a case said search request does not include an interrogative pronoun, or a component qualified by an interrogative pronoun, in case said search request sentence includes the interrogative pronoun;

a search criteria generation process generating search criteria based on said topic of query extracted in said analyzing the intension of query;

a search execution process-searching said database using said generated search criteria and retrieving, as search results, information which are intended for said topic of query;

a determining an output format process of determining an output format of search results based on said topic of the query without further input by the user; and a presentation process receiving the result of said output formatting process to output said search results which are selected items to be presented to the user.

24. The computer readable medium according to claim 23, wherein:

said query intention analysis process comprises determining a topic item, said topic item being a core topic of the search request; and said determining an output format process comprises selecting an item to be presented to said user based on the determination whether or not the item is the topic item.

25. The computer readable medium according to claim 24, wherein said determining an output format process comprises processing information by ordering the search results of the presentation items.

26. The computer readable medium according to claim 24, wherein said determining an output format process comprises adjusting the level of detailedness of the presentation to provide all specific items or only main items relating to a particular subject.

27. The computer readable medium according to claim 24, wherein said determining an output format process classifies the search results according to specified item values to organize by category the information to be presented to the user.

28. The computer readable medium according to claim 23, wherein said determining an output format process uses data specifying an item relating to a particular item to add the item relating to the particular item to the items to be presented, after the items to be presented to said user is determined.

29. The computer readable medium according to claim 23, wherein:
   said search criteria generation process stores information about correspondence between a word used for specifying search criteria in an item in the database and an item name in the database; and
   said determining an output format process replaces said item name in the database with said word to present said search results.

30. The computer readable medium according to claim 23, wherein:
   said search criteria generation process determines an item under which a value is specified as search criteria; and
   said determining an output format process removes an item used as the search criteria from presentation items after the presentation items are determined and adds the value of said item to the presentation items as presentation items are determined and adding the value of said item to the presentation items as a description of said presentation items.

31. The computer readable medium according to claim 23, wherein an item under which a value is specified and for which no search data is included in the search results is excluded from presentation items during the selection of the presentation items in said output formatting process.

32. The computer readable medium according to claim 23, wherein said search criteria generation process comprises:
   providing an item database containing all the values in a particular item that are held in a database to be searched; and,
   if a specified value in criteria specification generated for an item is not contained in said item database, providing an alert to the user for indicating a search failure and the cause thereof before executing the entire search process.

33. The computer readable medium according to claim 23, wherein said search criteria generation process comprises:
   providing an item database containing all the values in a particular item that are held in a database to be searched; and,
   if no entry in said item database matches a specified value in the item in the search request, searching for entries similar to the specified value and presenting said entries to the user as alternative item value candidates from which the user can make a selection.

34. The computer readable medium according to claim 33, wherein said search criteria generation process comprises presenting to a user an alternative to a specified value in an item, and, if said alternative is accepted by said user, storing the pair of the originally specified value and the alternative as synonymous words for the value in an item to use said pair to automatically widen criteria during the generation of search criteria.

35. The computer readable medium according to claim 23, wherein said search criteria generation process comprises:
   generating search criteria to be first used in said search execution process;
   determining whether the search succeeds or fails based on the number of results of the search performed in said search execution process; and
   if it is determined that said search fails, widening the search criteria so as to increase the number of search sets; and
   widening the search criteria and causing the search to be repeated in said search execution process until the search succeeds or the search criteria become unable to be widened.

36. The computer readable medium according to claim 35, wherein, if an item in the database to be searched is configured so as to correspond to a particular event, value specification for a particular item is extended to value specification for an event relating to the event associated with said item to widen search criteria.

37. The computer readable medium according to claim 35, wherein if the database to be searched is composed of structured text and the search criteria generated in said search criteria generation process specify a structure tag and corresponding text, said structure tag is replaced with a tag covering broader text range in a tag hierarchy to widen the search criteria.

38. The computer readable medium according to claim 23, wherein:
   if the analysis at said search request analysis fails, an alert concerning the form of the search request is provided; and
   it is determined whether or not an item extracted as a topic in the search request at a generating a search request corresponds to an item in the database to be searched, and, if an analysis of the correspondence fails, an alert is provided to the user indicating that the query is outside the scope of the system.

39. The computer readable medium according to claim 23, wherein a list of keywords unique to each of various areas is provided and the list is used to determine the area of the search request in said search request analysis process; and
   if it is determined that the area of the search request is not addressed by the system, an alert is provided to the user for indicating that the query is outside the scope of the system.

40. The computer readable medium according to claim 23, wherein search criteria, for an item on a main item list provided in advance, are generated for a query topic for which no correspondence to an item in the database is found in said search criterion generation process further comprising repeating the search in each of the main items and presenting the search results to the user.

41. The query-and-response processing program for a computer recording medium according to claim 23, wherein the database to be searched is a text base structured with tags, and if the analysis of a search request shows that the query is about a word without tag, the word is first used to perform a simple keyword search without tag and the results of the search are classified by tag added to words to be searched to present the results to the user.

42. The computer readable medium according to claim 23, wherein the database to be searched is a text base structured with tags and, when text to be searched is entered into the database, a provided list of items essential to a subject covered by the text base is referenced to determine whether an essential item of one of items constituting a subject of the text to be entered is described in the text, and, if it is determined that the essential item is missing, a secondary database provided for the missing item is searched by specifying a value for a key item of the subject in said text to be entered and said text is complemented with a value obtained.

43. The computer readable medium according to claim 23, wherein, if a main database composed of a text base structured with tags and a secondary database holding values of tags contained in the main database are provided as databases to be searched, upon the secondary database relating to an item in search criteria, the secondary database is first searched by specifying a value for an item to be searched for, a list of values for a key item is generated from a search set obtained, and then the list is replaced with a value specified for the tag to search through the main database.

44. The query-and-response processing program for a computer recording medium according to claim 23, wherein, if the database to be searched is a text base structured with tags, values for individual items are extracted and entered into individual databases at the same time when text to be searched is entered into the text database, and a group of spellings resembling each other is retrieved from each of the individual databases after the completion of the entry to enable a precise detection of variations in notation compared with that in a case where the entire text is searched.

45. A query-and-response processing apparatus for receiving a search request concerning a query input by a user and searching a database to present search results to the user, comprising:

a search request analyzing module analyzing a search request sentence provided by said user using syntactic parsing;

a query intention analyzing module analyzing an intention of the query based on the analyzed search request sentence, wherein the analyzing comprises:

determining whether said search request sentence includes an interrogative, and extracting, as a topic of query, either a top level component of syntactic hierarchy of said search request sentence, in a case said search request sentence does not include an interrogative pronoun, or a component qualified by an interrogative pronoun in a case said search request sentence includes the interrogative pronoun;

a search criteria generating module generating search criteria based on said topic of query extracted in said analyzing the intention of query;

a search executing module searching said database using said generated search criteria and retrieving, as search results, information that are intended for said topic of query;

an output format determining module determining an output format of search results based on said topic of the query without further input by the user; and an output module outputting said search results that are selected items to be presented to the user.

* * * * *